US012381033B2

(12) United States Patent
Fujii et al.

(10) Patent No.: US 12,381,033 B2
(45) Date of Patent: Aug. 5, 2025

(54) LAMINATED COIL, COIL DEVICE, AND POWER CONVERSION DEVICE

(71) Applicant: Mitsubishi Electric Corporation, Tokyo (JP)

(72) Inventors: Kenta Fujii, Tokyo (JP); Takashi Kumagai, Tokyo (JP); Tomohito Fukuda, Tokyo (JP); Shoichiro Nishizawa, Sanda (JP); Koshin Uomoto, Sanda (JP)

(73) Assignee: Mitsubishi Electric Corporation, Tokyo (JP)

( * ) Notice: Subject to any disclaimer, the term of this patent is extended or adjusted under 35 U.S.C. 154(b) by 818 days.

(21) Appl. No.: 17/622,353

(22) PCT Filed: Aug. 5, 2020

(86) PCT No.: PCT/JP2020/030030
§ 371 (c)(1),
(2) Date: Dec. 23, 2021

(87) PCT Pub. No.: WO2021/039329
PCT Pub. Date: Mar. 4, 2021

(65) Prior Publication Data

US 2022/0246347 A1 Aug. 4, 2022

(30) Foreign Application Priority Data

Aug. 23, 2019 (JP) ................................ 2019-152866

(51) Int. Cl.
*H01F 27/32* (2006.01)
*H01F 27/28* (2006.01)
*H01F 27/30* (2006.01)

(52) U.S. Cl.
CPC ....... *H01F 27/323* (2013.01); *H01F 27/2823* (2013.01); *H01F 27/306* (2013.01)

(58) Field of Classification Search
CPC .. H01F 27/323; H01F 27/2823; H01F 27/306; H01F 27/22; H01F 27/263; H01F 27/266; H01F 27/2847; H01F 27/2871
See application file for complete search history.

(56) References Cited

U.S. PATENT DOCUMENTS

2007/0047266 A1 3/2007 Nakahori
2009/0196073 A1 8/2009 Nakahori
(Continued)

FOREIGN PATENT DOCUMENTS

JP H08316054 A 11/1996
JP 2011062079 A 3/2011
(Continued)

OTHER PUBLICATIONS

International Search Report (PCT/ISA/210) with translation and Written Opinion (PCT/ISA/237) mailed on Oct. 20, 2020, by the Japan Patent Office as the International Searching Authority for International Application No. PCT/JP2020/030030. (11 pages).

*Primary Examiner* — Mang Tin Bik Lian
(74) *Attorney, Agent, or Firm* — Buchanan Ingersoll & Rooney PC

(57) ABSTRACT

A laminated coil includes planar coils and a first insulating member. The planar coils are arranged in a first direction intersecting a first surface. The first insulating member is in a film form and arranged between a pair of planar coils adjacent to each other in the first direction. At least one of the planar coils is wound to have a plurality of turns spaced apart from each other in a second direction along the first surface. A second insulating member is arranged between the turns adjacent to each other in the second direction of at least one of the planar coils.

15 Claims, 21 Drawing Sheets

(56) References Cited

U.S. PATENT DOCUMENTS

| | | | | |
|---|---|---|---|---|
| 2010/0079229 | A1* | 4/2010 | Koprivnak | H01F 27/29 336/200 |
| 2011/0037405 | A1* | 2/2011 | Suganuma | H02M 7/003 336/200 |
| 2012/0249279 | A1* | 10/2012 | Itou | H01F 27/324 336/170 |
| 2013/0093553 | A1* | 4/2013 | Moiseev | H01F 27/22 336/55 |
| 2018/0197669 | A1* | 7/2018 | Cioffi | H01F 27/306 |
| 2019/0019609 | A1* | 1/2019 | Fujii | H01F 27/24 |
| 2019/0304654 | A1* | 10/2019 | Choi | H01F 27/255 |

FOREIGN PATENT DOCUMENTS

| | | | | | |
|---|---|---|---|---|---|
| JP | 2013168401 | A | | 8/2013 | |
| JP | 2016-111130 | | * | 6/2016 | |
| JP | 2016111130 | A | | 6/2016 | |
| JP | 2018074095 | A | | 5/2018 | |
| JP | 2018074096 | A | | 5/2018 | |
| JP | 2018198252 | A | | 12/2018 | |
| WO | WO 2017-126315 | | * | 7/2017 | |
| WO | WO-2017126315 | A1 | * | 7/2017 | H01F 27/08 |

* cited by examiner

LAMINATED COIL, COIL DEVICE, AND POWER CONVERSION DEVICE

TECHNICAL FIELD

The present disclosure relates to a laminated coil, a coil device including the same, and a power conversion device.

BACKGROUND ART

A power conversion device such as a DC/DC converter is equipped with a coil device such as a smoothing choke and a transformer. The coil device is typically formed by winding a coil around a core. In recent years, in order to downsize the transformer as a coil device, the switching frequency of switching elements mounted on the power conversion device is set to a high frequency, for example, 1 kHz or higher. This can reduce the cross-sectional area of the core and reduce the turns of the coil, thereby downsizing the transformer.

As the transformer is downsized, heat generated from the coil included in the transformer increases. The downsized coil with a smaller cross-sectional area has a larger electrical resistance. The downsized coil therefore has a larger temperature increase due to conduction loss when current is applied. Moreover, while the transformer can be downsized with a higher frequency of the switching elements, heat generated from the coil also increases in this case. When AC current flows through a conductor, skin effect occurs, in which current density is high at the surface of the conductor and decreases at a distance from the surface of the conductor. Therefore, as the frequency is higher, current intensively flows through the surface. For this reason, a planar coil that is a plate-like coil wound into a planar shape is used as disclosed in Japanese Patent Laying-Open No. 2018-198252 (PTL 1). In Japanese Patent Laying-Open No. 2018-198252, a plurality of planar coils having a plurality of turns are laminated. This forms a transformer that allows current having a high frequency to flow smoothly.

CITATION LIST

Patent Literature

PTL 1: Japanese Patent Laying-Open No. 2018-198252

SUMMARY OF INVENTION

Technical Problem

When a plurality of planar coils are laminated, the laminated planar coils may be displaced from each other and deformed in a direction along a plane. Moreover, in operation of the transformer after lamination of the planar coils, the planar coils may be deformed in a direction along the plane due to vibration. In Japanese Patent Laying-Open No. 2018-198252, coils are arranged on one surface and the other surface on the opposite side of an insulating substrate having high rigidity, and these coils are laminated. Because of this configuration, the possibility that the coils are deformed and the turns included in the coils come into contact with each other and short-circuited is relatively low. However, in a laminated structure having no insulating substrate as described above and including planar coils arranged on one and the other main surfaces of a film-like insulating member, the displacement of planar coils, vibration, and therefore deformation are likely to occur. As a result of such deformation, a pair of adjacent turns among a plurality of turns in the planar coils may come into contact with each other and short-circuited. If the turns are short-circuited in this way, the coils may operate as if the turns are substantially fewer than the desired number of turns.

The present disclosure is made in view of the problem above. An object of the present invention is to provide a laminated coil, a coil device including the laminated coil, and a power conversion device, in which even without a substrate having high rigidity, short-circuiting between turns can be suppressed when planar coils included in the coil device are displaced or deformed due to vibration.

Solution to Problem

A laminated coil according to the present disclosure includes planar coils and a first insulating member. The planar coils are arranged in a first direction intersecting a first surface. The first insulating member is arranged between a pair of planar coils adjacent to each other in the first direction among the planar coils and is in a film form. At least one of the planar coils is wound to have a plurality of turns spaced apart from each other in a second direction along the first surface. A second insulating member is arranged between the turns adjacent to each other in the second direction of the at least one of the planar coils.

A coil device according to the present disclosure includes the laminated coil described above. The coil device includes the laminated coil and cores. The cores are spaced apart from each other in a longitudinal direction of the laminated coil. The laminated coil is arranged to be wound around the cores.

A power conversion device according to the present disclosure includes the coil device as described above. The coil device includes a support, a protruding member, and a fixing member. The protruding member is fixed to the support. The fixing member is arranged at a position overlapping with the protruding member in a two-dimensional view. The laminated coil is sandwiched and fixed between the fixing member and the protruding member so as to be in contact with the fixing member and the protruding member.

Advantageous Effects of Invention

The present disclosure provides a laminated coil, a coil device including the laminated coil, and a power conversion device, in which even without a substrate having high rigidity, short-circuiting between turns can be suppressed when planar coils included in the coil device are displaced or deformed due to vibration.

DESCRIPTION OF EMBODIMENTS

Embodiments of the present invention will be described below with reference to the drawings. The X direction, the Y direction, and the Z direction are introduced for convenience of explanation.

First Embodiment

<Introduction>

Figure 4:
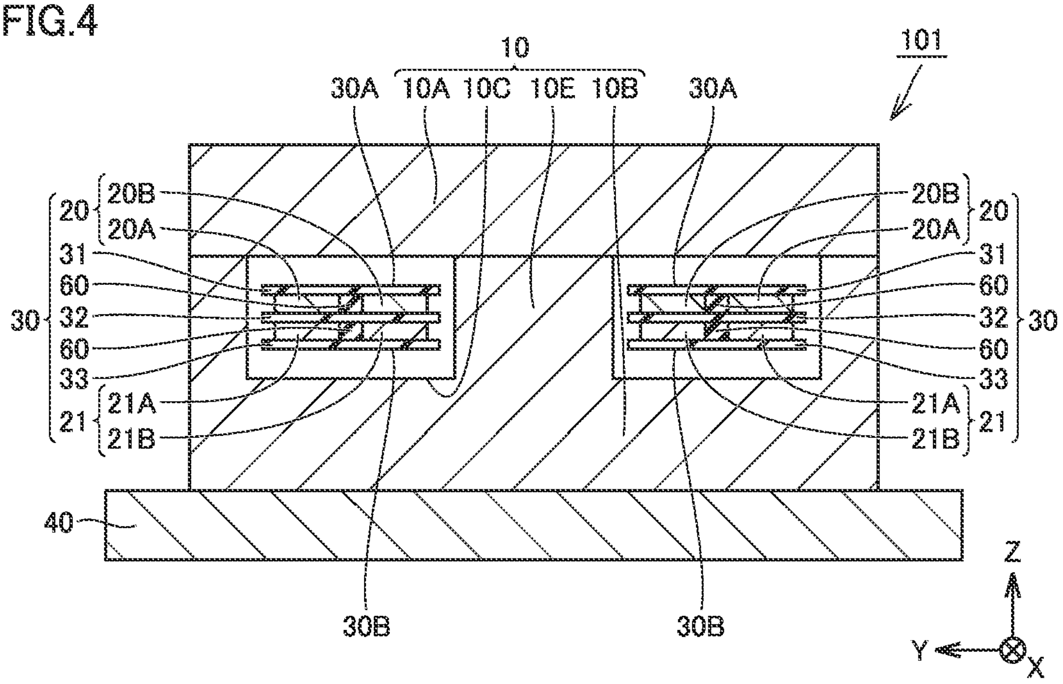
FIG. 4 is a schematic cross-sectional view of the coil device in FIG. 3 in a portion along line A-A in FIG. 3 in the first embodiment.

First of all, the configuration characteristics of a laminated coil in the present embodiment will be described briefly. Referring to FIG. 4, a laminated coil 30 included in a power conversion device in the present embodiment includes planar coils and a first insulating member 32. A plurality of planar coils are arranged as a first coil 20 and a second coil 21 with respect to a first direction intersecting a first surface along the XY plane, that is, the Z direction. First insulating member 32 is arranged between first coil 20 and second coil 21 as a pair of planar coils adjacent to each other in the Z direction among a plurality of planar coils. First insulating member 32 is in a film form. At least one of first coil 20 and second coil 21 as a plurality of planar coils is wound to have a plurality of turns spaced apart from each other with respect to a second direction along the first surface, that is, a direction along the XY plane. A second insulating member 60 is arranged between a plurality of turns adjacent to each other in the second direction in at least one of first coil 20 and second coil 21. The laminated coil and a coil device including the laminated coil will be described below. The coil device is one of devices included in the power conversion device.

<Configuration of Power Conversion Device>

Figure 1:
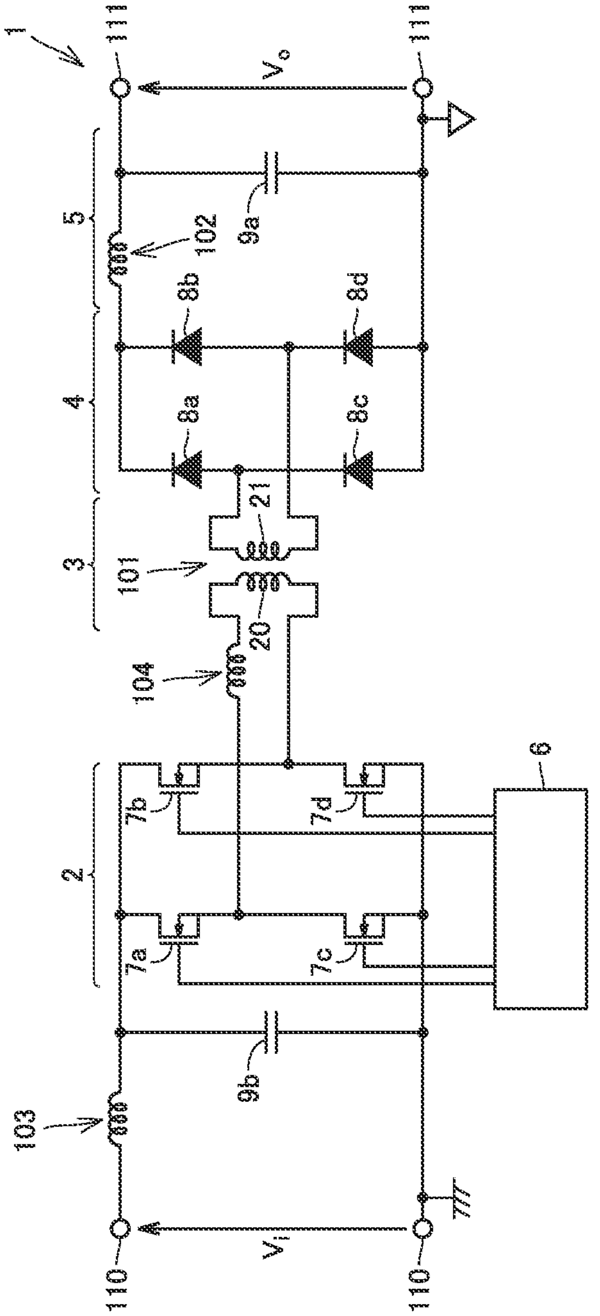
FIG. 1 is a circuit diagram showing a configuration of a power conversion device according to embodiments.

FIG. 1 is a circuit diagram showing a configuration of the power conversion device according to embodiments. Referring to FIG. 1, a power conversion device 1 is a DC/DC converter but may be a device that converts AC voltage. Power conversion device 1 mainly includes an inverter circuit 2, a transformer circuit 3, a rectifying circuit 4, a smoothing circuit 5, and a control circuit 6. Power conversion device 1 converts DC voltage Vi input from an input terminal 110 into DC voltage Vo and outputs DC voltage Vo from an output terminal 111.

Inverter circuit 2 includes four switching elements 7*a*, 7*b*, 7*c*, and 7*d*. For example, in FIG. 1, a series connection of switching element 7*a* and switching element 7*c* and a series connection of switching element 7*b* and switching element 7*d* are connected in parallel. Each of switching elements 7*a*, 7*b*, 7*c*, and 7*d* is, for example, a metal oxide semiconductor field effect transistor (MOSFET) or an insulated gate bipolar transistor (IGBT). For each of switching elements 7*a*, 7*b*, 7*c*, and 7*d*, one selected from the group consisting of silicon (Si), silicon carbide (SiC), and gallium nitride (GaN) is used as its material.

Transformer circuit 3 has a coil device 101 as a transformer. Coil device 101 includes first coil 20 and second coil 21. First coil 20 is a primary-side conductor, that is, a high voltage-side winding, connected to inverter circuit 2. Second coil 21 is a secondary-side conductor, that is, a low voltage-side winding, connected to rectifying circuit 4.

Rectifying circuit 4 includes four diodes 8*a*, 8*b*, 8*c*, and 8*d*. For example, in FIG. 1, a series connection of diode 8*a* and diode 8*c* and a series connection of diode 8*b* and diode 8*d* are connected in parallel. For each of diodes 8*a*, 8*b*, 8*c*, and 8*d*, one selected from the group consisting of silicon (Si), silicon carbide (SiC), and gallium nitride (GaN) is used as its material.

Smoothing circuit 5 includes a coil device 102 as a smoothing choke and a capacitor 9*a*. Control circuit 6 plays a role of outputting a control signal for controlling inverter circuit 2 to inverter circuit 2. Inverter circuit 2 converts an input voltage and outputs the converted voltage.

Power conversion device 1 includes a coil device 103 as a smoothing choke and a capacitor 9*b* at a stage preceding inverter circuit 2. Power conversion device 1 includes a coil device 104 as a resonant coil between inverter circuit 2 and transformer circuit 3. More specifically, coil device 104 is connected between first coil 20 and a point between switching element 7*a* and switching element 7*c*.

For example, DC voltage Vi of 100 V or higher and 600 V or lower is input to power conversion device 1. Power conversion device 1 outputs, for example, DC voltage Vo of 12 V or higher and 600 V or lower. Specifically, DC voltage Vi input to input terminal 110 of power conversion device 1 is converted to a first AC voltage by inverter circuit 2. The first AC voltage is converted to a second AC voltage lower than the first AC voltage by transformer circuit 3. The second AC voltage is rectified by rectifying circuit 4. Smoothing circuit 5 smooths the voltage output from rectifying circuit 4. Power conversion device 1 outputs DC voltage Vo output from smoothing circuit 5, from output terminal 111. DC voltage Vi may be of a magnitude equal to or higher than DC voltage Vo.

Referring now to FIG. 2 to FIG. 7 and FIG. 8 to FIG. 10 as a modification, a configuration of laminated coil 30 included in the power conversion device in the present embodiment will be described. Referring further to FIG. 2 to FIG. 10 and FIG. 11, a configuration of coil device 101 including the laminated coil 30 will be described.

<Configuration of Laminated Coil 30>

Figure 2:
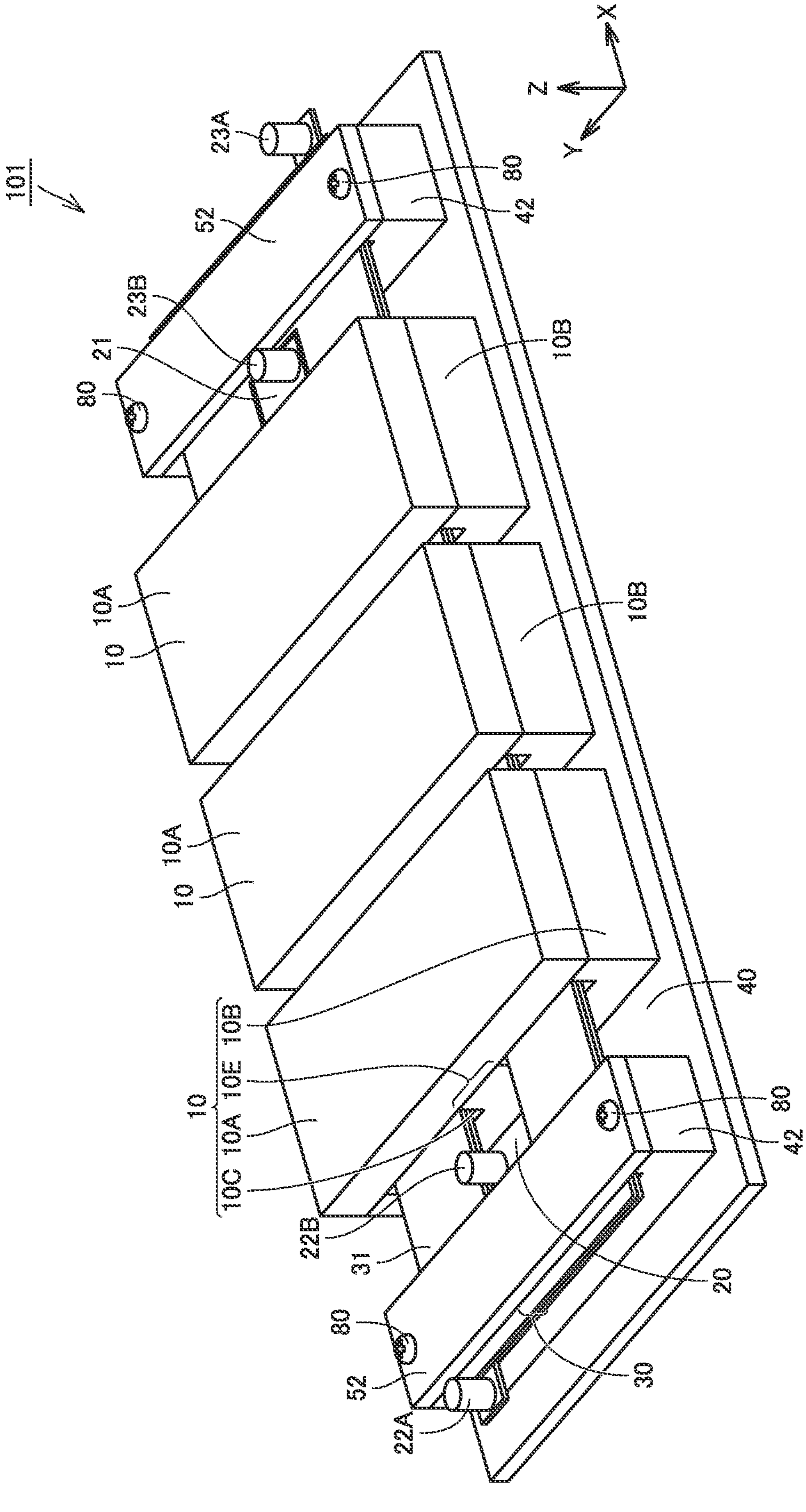
FIG. 2 is a schematic perspective view showing a configuration of a coil device as a transformer according to a first embodiment.
Figure 3:
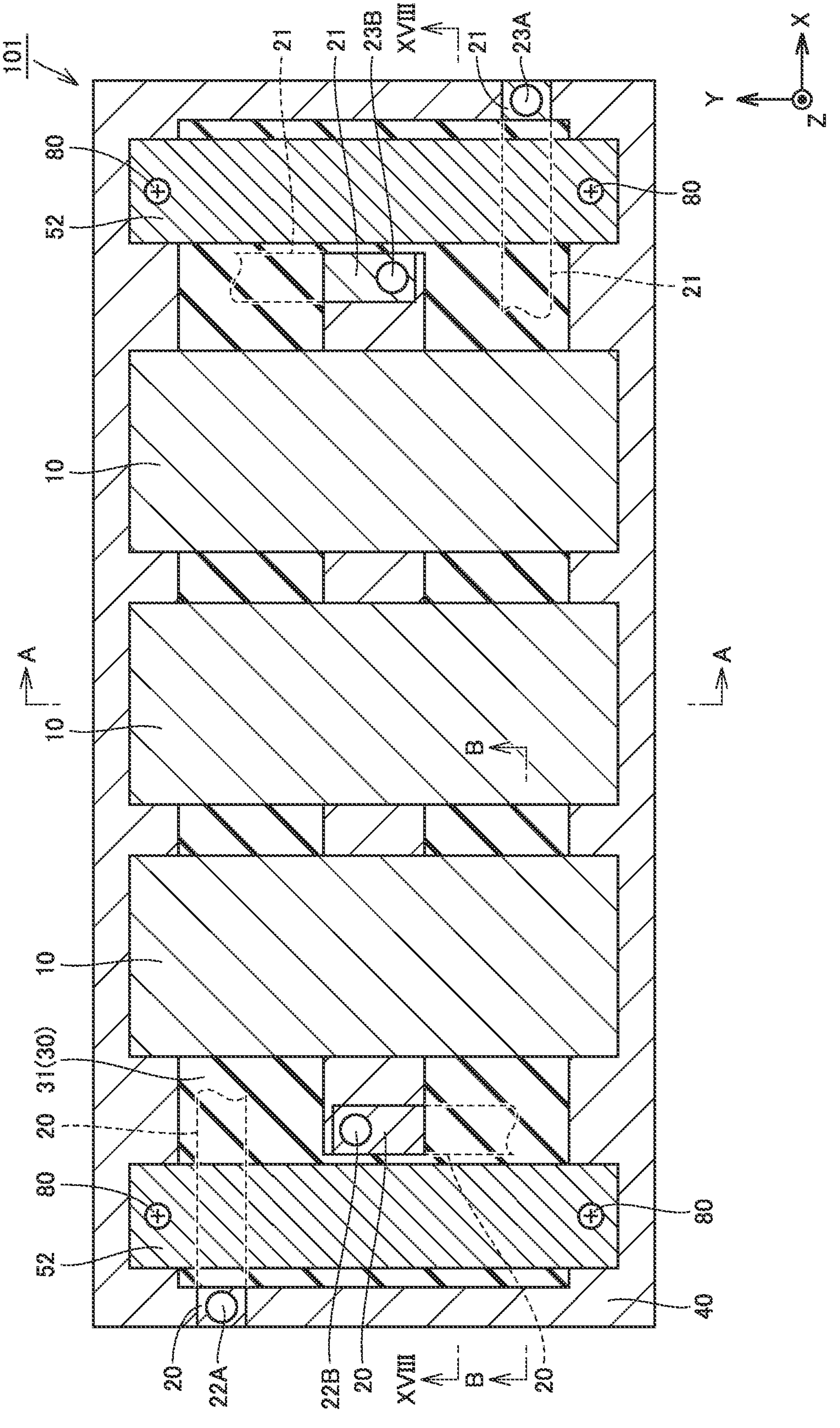
FIG. 3 is a schematic plan view of the coil device in FIG. 2.
Figure 5:
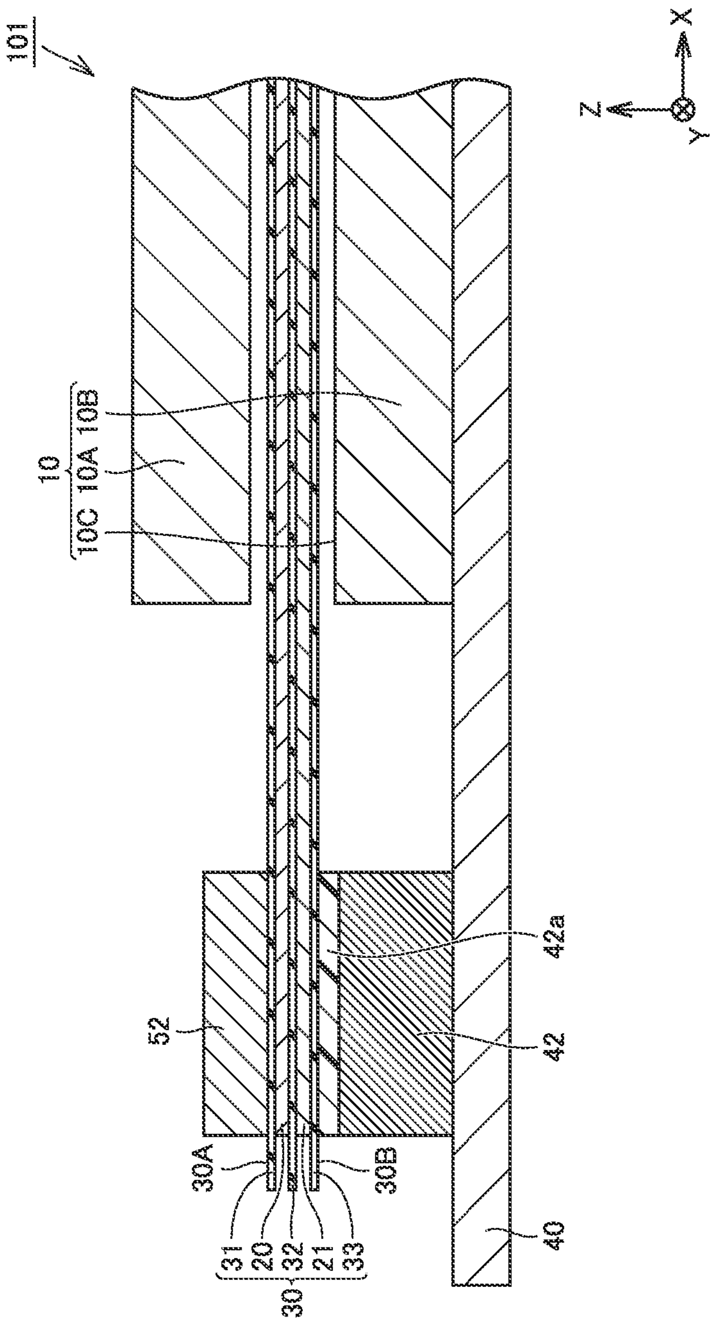
FIG. 5 is a schematic cross-sectional view of the coil device in FIG. 3 in a portion along line B-B in FIG. 3 in the first embodiment.
Figure 6:
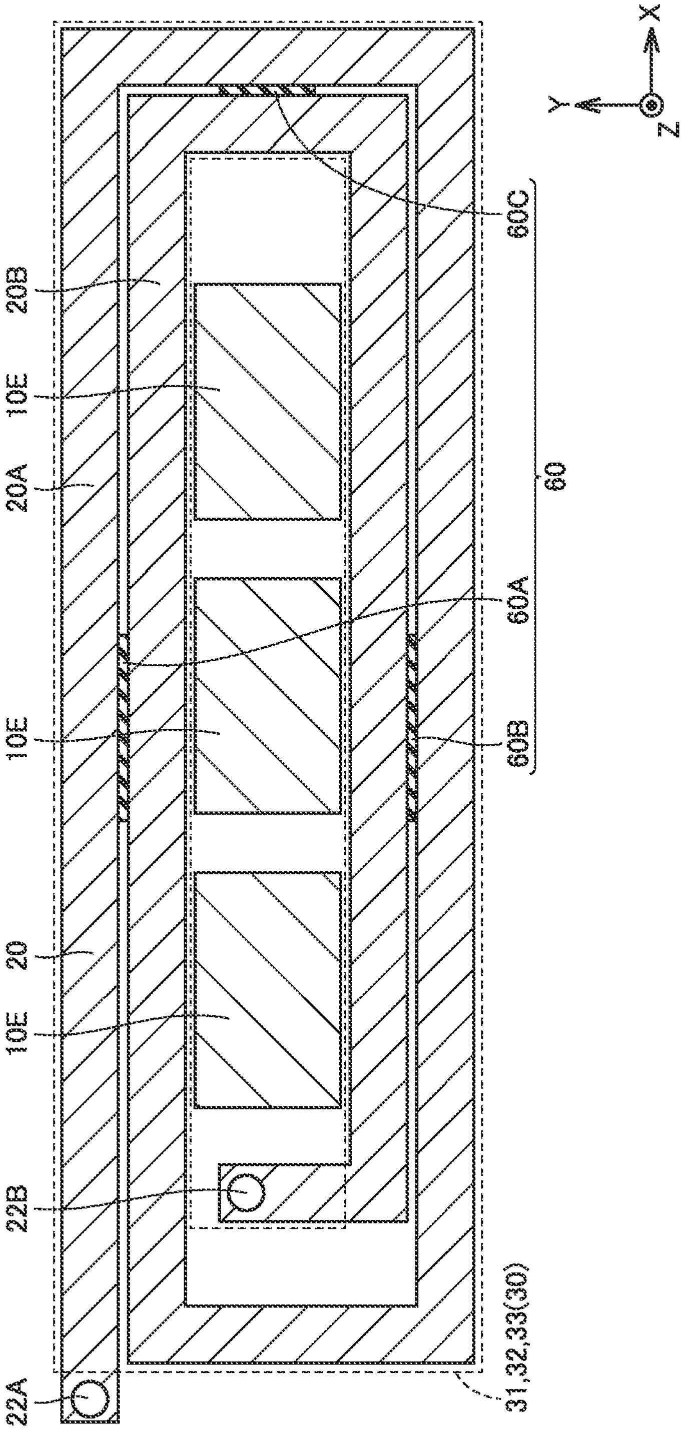
FIG. 6 is a schematic plan view of a portion of a first coil extracted from the coil device in FIG. 2.
Figure 7:
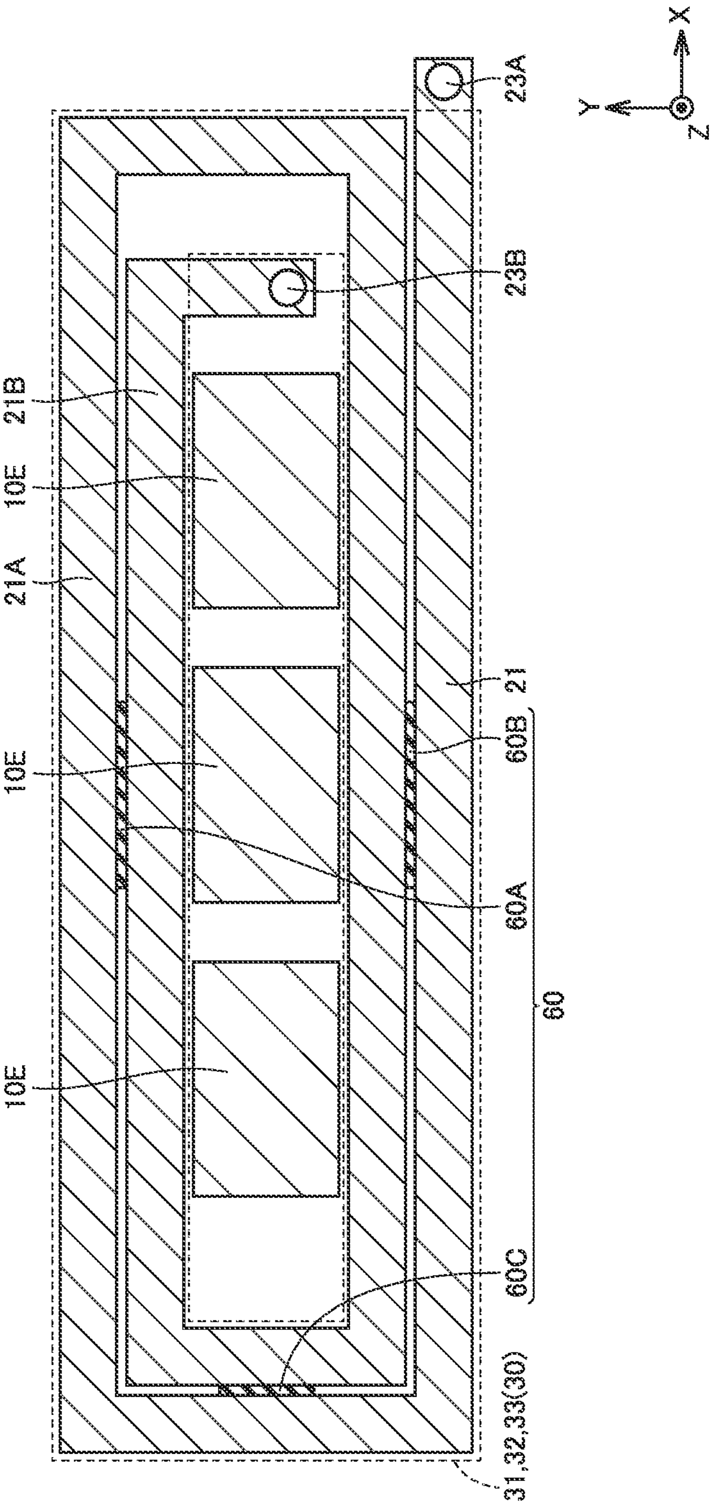
FIG. 7 is a schematic plan view of a portion of a second coil extracted from the coil device in FIG. 2.

FIG. 2 is a schematic perspective view showing a configuration of the coil device as a transformer according to the first embodiment. FIG. 3 is a schematic plan view of the coil device in FIG. 2. FIG. 4 is a schematic cross-sectional view of the coil device in FIG. 3 in a portion along line A-A in FIG. 3 in the first embodiment. FIG. 5 is a schematic cross-sectional view of the coil device in FIG. 3 in a portion along line B-B in FIG. 3 in the first embodiment. FIG. 6 is a schematic plan view of a portion of the first coil extracted from the coil device in FIG. 2. FIG. 7 is a schematic plan view of a portion of the second coil extracted from the coil device in FIG. 2. Referring to FIG. 2 to FIG. 7, coil device 101 in the present embodiment is an example of coil device 101 as a transformer included in power conversion device 1 shown in FIG. 1.

Referring to FIG. 2 and FIG. 3, coil device 101 includes laminated coil 30, cores 10, protruding members 42, and fixing members 52. These are mounted on, for example, a surface of a support 40.

Referring to FIG. 4 and FIG. 5, laminated coil 30 includes first coil 20 and second coil 21 as a plurality of planar coils having a relatively large surface area in a two-dimensional view. Laminated coil 30 also includes a third insulating member 31, a first insulating member 32, and a third insulating member 33. In laminated coil 30, third insulating member 31, first coil 20, first insulating member 32, second coil 21, and third insulating member 33 are laminated in this order from the upper layer to the lower layer. Referring to FIG. 6, the main surface of first coil 20 and second coil 21, that is, a surface having the largest area is the first surface. First coil 20 and second coil 21 each have, for example, a substantially flat plate shape with the first surface extending along the XY plane. In other words, first coil 20 and second coil 21 have a linear portion extending linearly with respect to the turning direction. However, the planar shape of first coil 20 and second coil 21 is not limited to a rectangle and, for example, may have arc-shaped corners. Alternatively, first coil 20 and second coil 21 each may have an annular planar shape as a whole. These first coil 20 and second coil 21 correspond to first coil 20 and second coil 21 of coil device 101 in FIG. 1. These first coil 20 and second coil 21 are arranged to be aligned in the Z direction that is the first direction intersecting the first surface.

The members laminated from the upper layer to the lower layer to form laminated coil 30 may be in direct contact with each other with respect to the Z direction or may be in contact with another bonding member interposed. When another bonding member is interposed, for example, a tacky layer or an adhesive layer may be bonded to the main surface of each member forming laminated coil 30. Laminated coil 30 may be formed with the tacky layer or the adhesive layer interposed, and a pair of members adjacent in the Z direction in FIG. 5 may be bonded. In other words, in laminated coil 30, first insulating member 32 may be bonded to first coil 20 or second coil 21 by the tacky layer or the adhesive layer. In laminated coil 30, third insulating member 31 may be bonded to first coil 20 or third insulating member 33 may be bonded to second coil 21 by the tacky layer or the adhesive layer. In laminated coil 30, second insulating member 60 may be bonded to a member adjacent thereto by the tacky layer or the adhesive layer. In this case, the members are bonded by the tacky layer or the adhesive layer whereby laminated coil 30 having the integrated members is formed.

In laminated coil 30, first insulating member 32 is sandwiched between first coil 20 and second coil 21 adjacent to each other in the Z direction. Thus, first coil 20 that is a high voltage-side winding and second coil 21 that is a low voltage-side winding are electrically insulated in coil device 101. In laminated coil 30, third insulating member 31 is arranged above first coil 20, and third insulating member 33 is arranged below second coil 21. In other words, third insulating member 31 is arranged at one end, that is, the upper end of laminated coil 30 in the Z direction, and third insulating member 33 is arranged at the other end, that is, the lower end. The uppermost surface of the entire laminated coil 30, that is, the upper surface of third insulating member 31 is one surface 30A. The lowermost surface of the entire laminated coil 30, that is, the lower surface of third insulating member 33 is the other surface 30B. Thus, a pair of third insulating member 31 and 33 are arranged on the top and the bottom of the entire laminated coil 30 such that first coil 20 and second coil 21 and second insulating member 60 that are a plurality of planar coils are sandwiched therebetween. Third insulating members 31 and 33 are arranged such that at least a part of second insulating member 60 is sandwiched. Here, "the second insulating member is sandwiched between third insulating members 31 and 33" as long as at least a part of the second insulating member is sandwiched. Furthermore, first coil 20, second coil 21, and second insulating member 60 are sandwiched between first insulating member 32 and third insulating member 31 and sandwiched between first insulating member 32 and third insulating member 33.

Referring to FIG. 6 and FIG. 7, third insulating member 31, first insulating member 32, and third insulating member 33 are arranged in a region two-dimensionally overlapping with first coil 20 and second coil 21, substantially from the outermost edge to the innermost edge of first coil 20 and second coil 21, as indicated by a dotted line in FIG. 6 and FIG. 7. Third insulating member 31, first insulating member 32, and third insulating member 33 therefore are shaped like a rectangular and annular flat plate having a rectangular cavity approximately substantially at the center in a two-dimensional view.

More specifically, first coil 20 and second coil 21 in laminated coil 30 are formed as bus bars. The thickness in the Z direction of the bus bars as first coil 20 and second coil 21 is, for example, 1 mm or more and 5.0 mm or less. However, it is more preferable that the thickness is 0.5 mm or more and 2.0 mm or less. The thickness is controlled depending on the magnitude of current fed to first coil 20 and second coil 21. The width intersecting the extending direction of first coil 20 and second coil 21 and along the XY plane varies with the number of turns of coils.

As shown in FIG. 2, FIG. 3, and FIG. 6, a connection member 22A is provided at the outside end that is one end in the turning direction of first coil 20. A connection member 22B is provided at the inside end that is the other end in the turning direction of first coil 20. First coil 20 is wound clockwise from connection member 22A to connection member 22B. As shown in FIG. 2, FIG. 3, and FIG. 7, a connection member 23A is provided at the outside end that is one end in the turning direction of second coil 21. A connection member 23B is provided at the inside end that is the other end in the turning direction of second coil 21. Second coil 21 is wound clockwise from connection member 23A to connection member 23B. Connection members 22A, 22B, 23A, and 23B are, for example, terminal blocks and are electrically connected to electronic components that constitute inverter circuit 2 and rectifying circuit 4. Connection members 22A, 22B, 23A, and 23B are arranged so as not to be covered with other members and to be exposed.

In FIG. 6, the distance between an end portion extending in the Y direction of first coil 20 having connection member 22B and a portion adjacent thereto extending in the Y direction is wider than the distance between a first turn 20A and a second turn 20B adjacent to each other at another portion. The embodiment is not limited to such a configuration. More specifically, the distance between the end portion extending in the Y direction of first coil 20 having connection member 22B and the portion adjacent thereto extending in the Y direction may be substantially equal to the distance between first turn 20A and second turn 20B adjacent to each other at another portion.

In FIG. 7, the distance between an end portion extending in the Y direction of second coil 21 having connection member 23B and a portion adjacent thereto extending in the Y direction is wider than the distance between a first turn 21A and a second turn 21B adjacent to each other at another portion, in the same manner as described above. The embodiment is not limited to such a configuration. More specifically, the distance between the end portion extending in the Y direction of second coil 21 having connection member 23B and the portion adjacent thereto extending in the Y direction may be substantially equal to the distance between first turn 21A and second turn 21B adjacent to each other at another portion.

At least one of first coil 20 and second coil 21 is wound with more than one turn. In other words, at least one of first coil 20 and second coil 21 is wound to have a plurality of turns. One of first coil 20 and second coil 21 may be wound with one turn or less. In other words, one of first coil 20 and second coil 21 may have one turn, and the other may have two turns. Both of first coil 20 and second coil 21 may be wound to have more than one turn, that is, for example, with two turns. Hereinafter it is assumed that both of first coil 20 and second coil 21 are wound with more than one turn.

As an example, in FIG. 6, first coil 20 is wound with two turns. That is, in FIG. 6, first coil 20 has first turn 20A that is one turn on the outside, that is, on the side closer to connection member 22A, and second turn 20B that is one turn on the inside of first turn 20A, that is, on the side closer to connection member 22B. First turn 20A and second turn 20B are continuous to form a single first coil 20. First turn 20A and second turn 20B are spaced apart from each other in the second direction, that is, the circumferential direction along the XY plane.

Similarly, in FIG. 7, second coil 21 is wound with two turns. More specifically, in FIG. 6, second coil 21 has first turn 21A that is one turn on the outside, that is, on the side closer to connection member 23A, and second turn 21B that is one turn on the inside of first turn 21A, that is, on the side closer to connection member 23B. First turn 21A and second turn 21B are continuous to form a single second coil 21. First turn 21A and second turn 21B are spaced apart from each other in the second direction, that is, the circumferential direction along the XY plane.

As described above, in FIG. 6 and FIG. 7, first coil 20 and second coil 21 have the equal number of turns, two turns. However, in the present embodiment, first coil 20 and second coil 21 may have different numbers of turns. In the present embodiment, at least one of first coil 20 and second coil 21 is wound with two or more turns.

In first coil 20 and second coil 21, the cross-sectional area of a partial region in its turning direction may be different from that of another region in the turning direction. As used herein the cross-sectional area is a cross section intersecting the turning direction. Therefore, "the cross-sectional area varies with regions" means that, for example, the width intersecting the turning direction in a two-dimensional view varies from region to region in first coil 20 and second coil 21, if the thickness of first coil 20 and second coil 21 is uniform in its entirety.

As shown in FIG. 6 and FIG. 7, first coil 20 and a second coil 21 having a plurality of turns have second insulating member 60 between the turns adjacent to each other in the circumferential direction. Specifically, in first coil 20, second insulating member 60 is arranged between first turn 20A and second turn 20B. In second coil 21, second insulating member 60 is arranged between first turn 21A and second turn 21B. In FIG. 6, a second insulating member 60A is arranged at the center of a region extending in the X direction on the upper side of a wound portion 10E described later. A second insulating member 60B is arranged at the center of a region extending in the X direction on the lower side of wound portion 10E. A second insulating member 60C is arranged at the center of a region extending in the Y direction on the right side of wound portion 10E. That is, in FIG. 6, in total three second insulating members 60, that is, second insulating members 60A, 60B, and 60C are arranged.

Similarly, in FIG. 7, second insulating member 60A is arranged at the center of a region extending in the X direction on the upper side of wound portion 10E. Second insulating member 60B is arranged at the center of a region extending in the X direction on the lower side of wound portion 10E. Second insulating member 60C is arranged at the center of a region extending in the Y direction on the left side of wound portion 10E. That is, in FIG. 7, in total three second insulating members 60, that is, second insulating members 60A, 60B, and 60C are also arranged. However, the number of second insulating members 60 arranged between turns of each coil is not limited to the number described above and may be any number equal to or larger than one. More specifically, as shown in FIG. 6 and FIG. 7, when a plurality of second insulating members 60 are arranged, a plurality of second insulating members 60 are spaced apart from each other with respect to a direction in which a region between first turn 20A and second turn 20B extends. In other words, a plurality of second insulating members 60A, 60B, and 60C are arranged between first turn 20A, 21A and second turn 20B, 21B so as to be spaced apart from each other with respect to the circumferential direction in which laminated coil 30 is wound (spiral direction). As shown in FIG. 6 and FIG. 7, a plurality of second insulating members 60 may be arranged so as to be spaced apart from each other at only a part of the region between first turn 20A, 21A and second turn 20B, 21B. Alternatively, although not shown in the drawings, second insulating member 60 may be arranged as a single member so as to turn around in the entire region between first turn 20A, 21A and second turn 20B, 21B.

As shown in FIG. 4, a plurality of second insulating members 60 are arranged at a position equal to the position where first coil 20 and second coil 21 are arranged with respect to the Z direction. That is, second insulating member 60 has a thickness substantially equal to that of first coil 20 and second coil 21 in the Z direction. Second insulating members 60 are arranged to be aligned with first coil 20 and second coil 21 with respect to the X direction and the Y direction. Second insulating members 60 are thus laminated in laminated coil 30 in the same manner as first coil 20 and second coil 21. More specifically, in laminated coil 30, third insulating member 31, first coil 20 and second insulating members 60, first insulating member 32, second coil 21 and second insulating members 60, and third insulating member 33 are laminated in this order from the upper layer to the lower layer. Second insulating members 60 may be laminated in direct contact with third insulating member 31, 33 and first insulating member 32. Alternatively, second insulating members 60 may be laminated on third insulating member 31, 33 and first insulating member 32 with another bonding member interposed.

Figure 8:
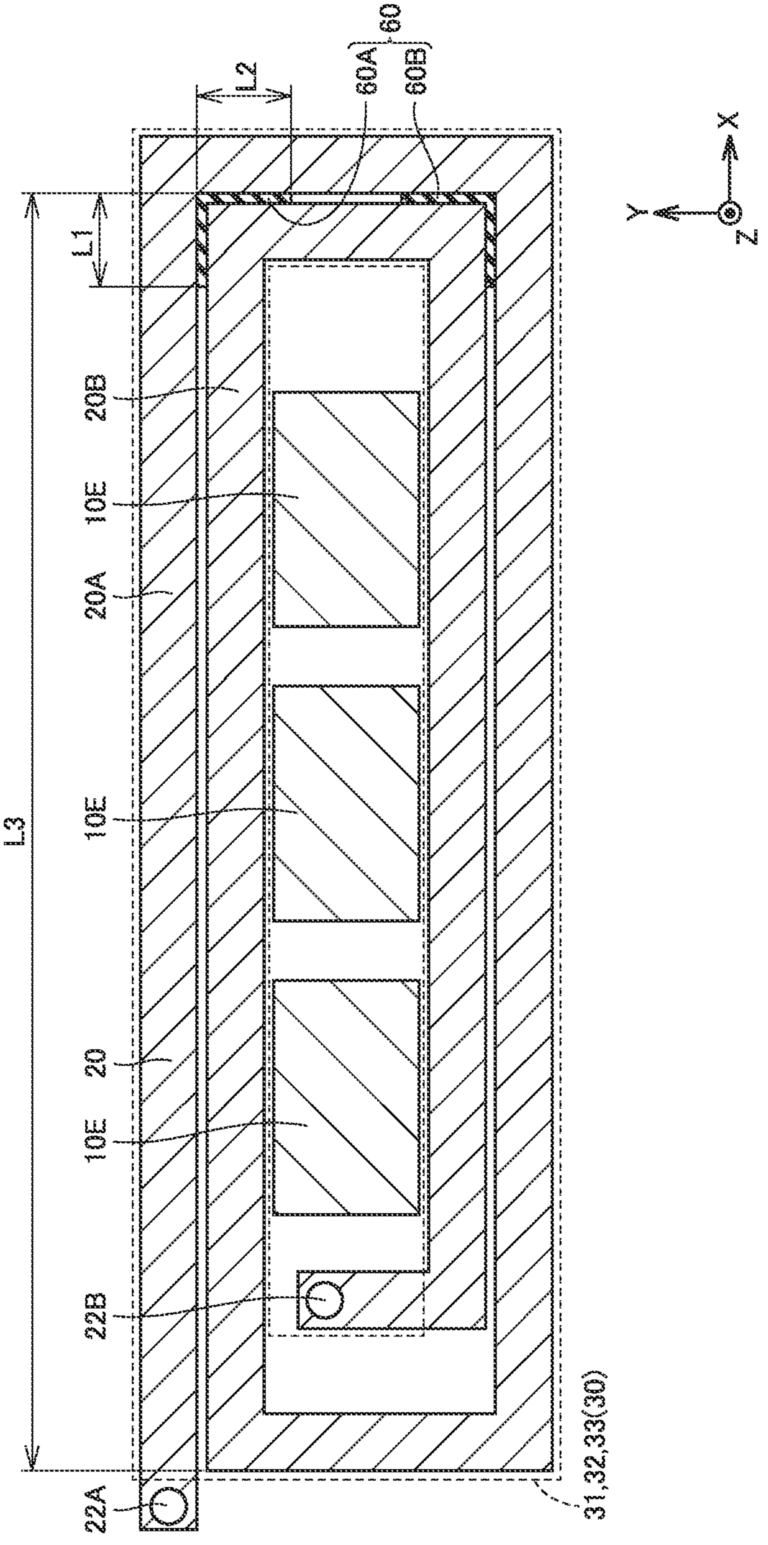
FIG. 8 is a schematic plan view of a portion of the first coil included in the coil device in FIG. 2 as a first modification to FIG. 6.

FIG. 8 is a schematic plan view of a portion of the first coil included in the coil device in FIG. 2 as a first modification to FIG. 6. Referring to FIG. 8, second insulating members 60 in first coil 20 are not limited to a linear planar shape as shown in FIG. 6 and FIG. 7. For example, as shown in FIG. 8, second insulating members 60A and 60B may have an L-shaped planar shape including a bending portion having a portion extending in the X direction and a portion extending in the Y direction. These second insulating members 60A and 60B are arranged at bending portions on the right side of FIG. 8, which are bending portions at a distance from at one end and the other end along the turning direction of first coil 20, that is, the arrangement positions of connection members 22A and 22B, in the opposite direction in the X direction.

In FIG. 8, second insulating members 60A and 60B are respectively arranged at two bending portions on the rightmost side in the drawing, in the region between first turn 20A and second turn 20B. Second insulating members 60A and 60B are spaced apart from each other in the Y direction. In second insulating members 60A and 60B in FIG. 8, the length L1 extending in the X direction is equal to the length L2 extending in the Y direction. However, the embodiment is not limited thereto. For example, first coil 20 in FIG. 8 has a dimension in the X direction larger than the dimension in the Y direction. In this case, second insulating members 60A and 60B in first coil 20 in FIG. 8 may have an L shape in which the length L1 extending in the X direction is longer than the length L2 extending in the Y direction.

Figure 9:
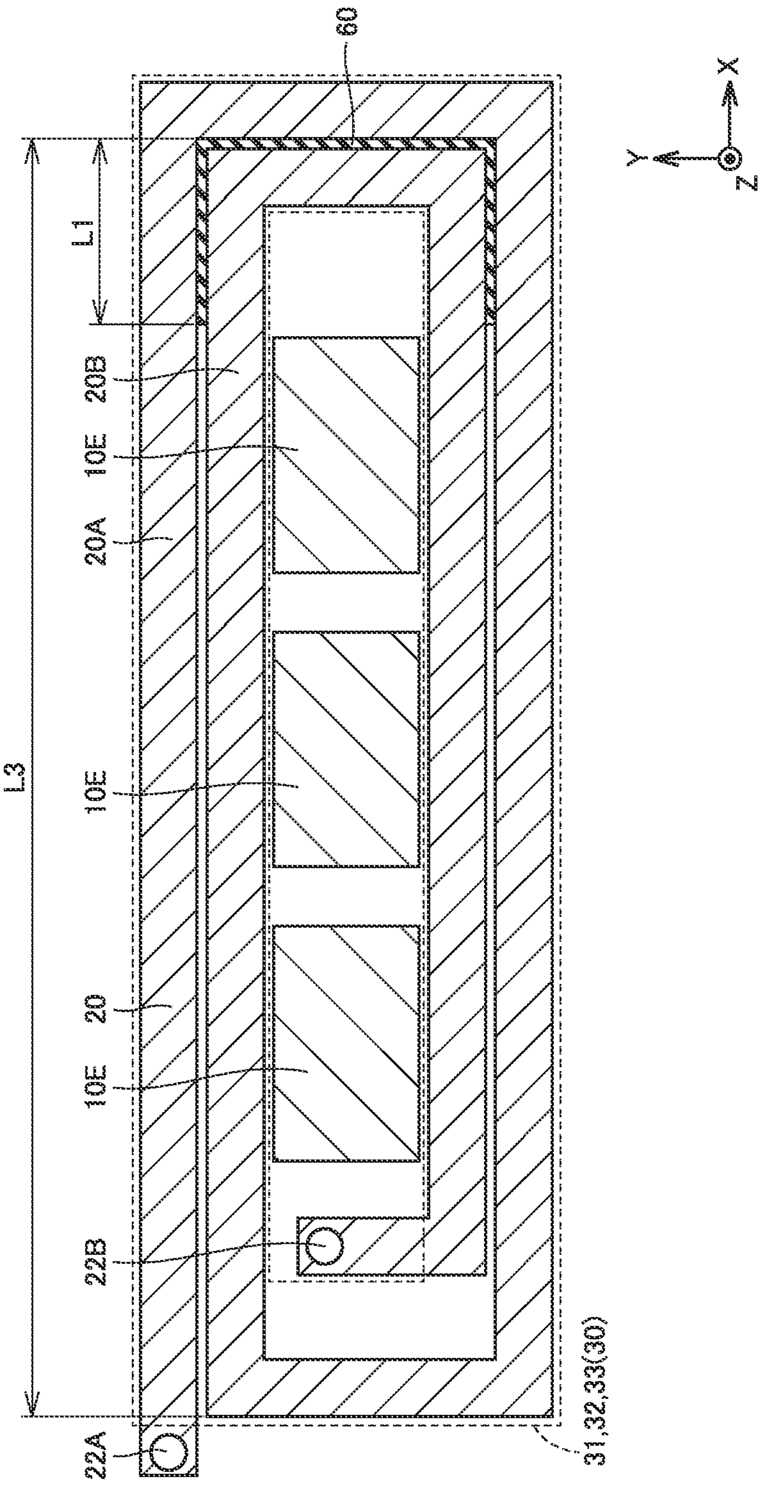
FIG. 9 is a schematic plan view of a portion of the first coil included in the coil device in FIG. 2 as a second modification to FIG. 6.

FIG. 9 is a schematic plan view of a portion of the first coil included in the coil device in FIG. 2 as a second modification to FIG. 6. Referring to FIG. 9, second insulating member 60 in first coil 20 includes, for example, the whole of a portion with a shorter dimension extending in the Y direction in the region between first turn 20A and second turn 20B. Second insulating member 60 is bent from a portion extending in the Y direction and extends in the X direction slightly, for example, by a dimension corresponding to L1. Such a configuration may be employed.

Figure 10:
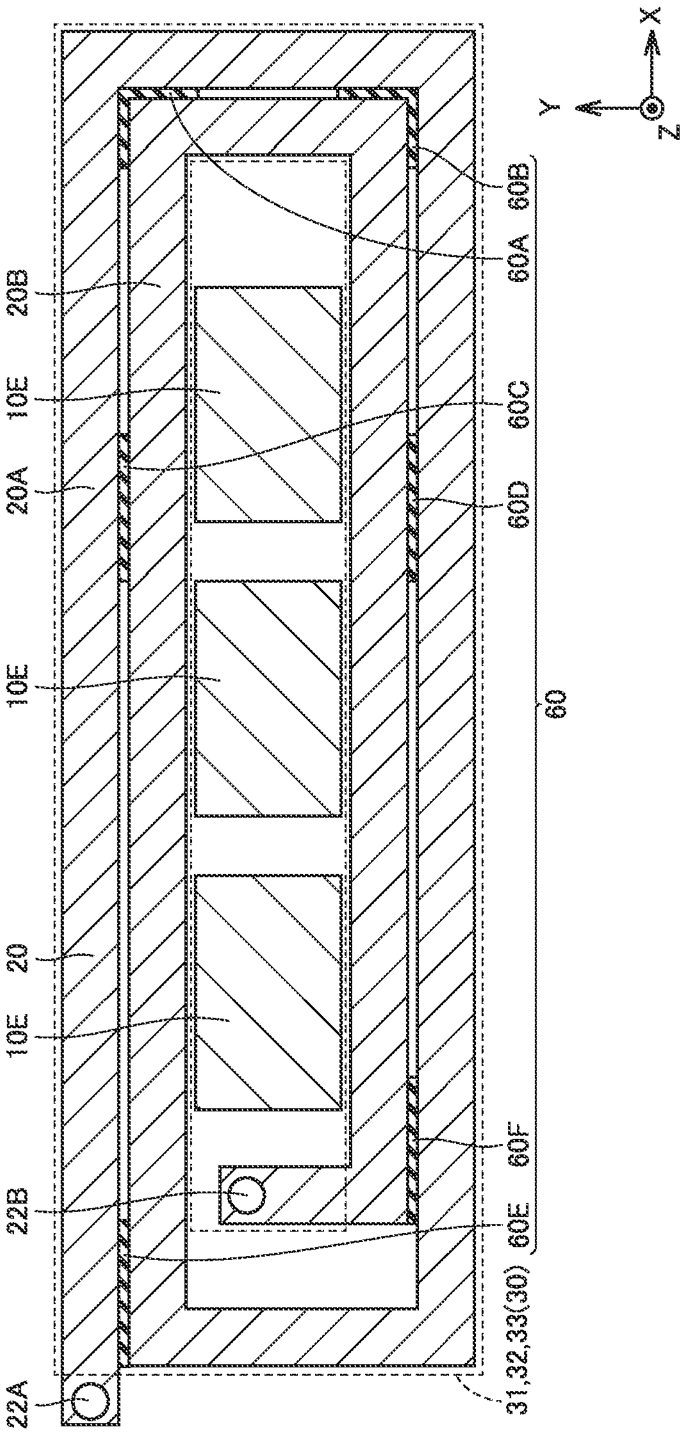
FIG. 10 is a schematic plan view of a portion of the first coil included in the coil device in FIG. 2 as a third modification to FIG. 6.

FIG. 10 is a schematic plan view of a portion of the first coil included in the coil device in FIG. 2 as a third modification to FIG. 6. Referring to FIG. 10, second insulating member 60 may have second insulating members 60A and 60B at bending portions similar to those in FIG. 8, second insulating members 60C and 60D at linear portions extending in the X direction similar to those in FIG. 6, and second insulating members 60E and 60F in the vicinity of one end and the other end in the turning direction. Second insulating member 60E has a linear planar shape arranged in a region adjacent to connection member 22A and extending in the X direction. Second insulating member 60F has a linear planar shape arranged in a region adjacent to connection member 22B and extending in the X direction. Second insulating members 60E and 60F are arranged on the left side in the X direction on which connection members 22A and 22B are arranged. Second insulating members 60A and 60B are arranged on the right side in the X direction that is the side opposite to the side on which connection members 22A and 22B are arranged. Second insulating members 60C and 60D are arranged at the middle therebetween in the X direction. Such a configuration may be employed.

It is preferable that second insulating members 60C and 60D in FIG. 10 are arranged at portions extending in the X direction with a larger dimension of first coil 20. First coil 20 is easily deformed in the X direction with a larger dimension. It is therefore more preferable that second insulating member 60 is arranged at a portion extending in the X direction. In particular, it is more preferable that a plurality of second insulating members 60 are arranged so as to be spaced apart from each other with respect to the X direction with a larger dimension of first coil 20. In FIG. 10, second insulating member 60C and second insulating member 60E are arranged to have such a positional relation. In FIG. 10, second insulating member 60D and second insulating member 60F are arranged to have such a positional relation.

In all of FIG. 8 to FIG. 10, second insulating members 60 are arranged so as to include the bending portions on the right side in the drawings that is the opposite direction in the X direction to connection members 22A and 22B. In this way, it is more preferable that second insulating members 60 are arranged at all of the bending portions in a two-dimensional view in the region between first turn 20A and second turn 20B.

The region extending in the X direction with a larger dimension of first coil 20 in the region between first turn 20A and second turn 20B can be said as follows. It is preferable that second insulating member 60 is arranged in a region corresponding to L1 that is a length of 10% or more of the length L3 in the X direction of a region in which the region between first turn 20A and second turn 20B extends in the X direction, as shown in FIG. 8 and FIG. 9. For example, this second insulating member 60 may singly take up the region corresponding to a length of 10% or more of the X-direction length of the region extending in the X direction, like second insulating member 60A in FIG. 6. Alternatively, the total length of a plurality of second insulating members 60 that take up in the X direction may be 10% or more of the X-direction length L3 of the region, like second insulating member 60C and second insulating member 60E in FIG. 10.

Furthermore, when first coil 20 and the like have three or more turns like a sixth embodiment (FIG. 16 and FIG. 17) described later, it is preferable that second insulating members 60 are arranged at all the bending portions in a plurality of regions between turns.

FIG. 8 to FIG. 10 depict second insulating member 60 between first turn 20A and second turn 20B of first coil 20. However, the embodiment is not limited thereto, and second insulating member 60 between first turn 21A and second turn 21B of second coil 21 may have a configuration similar to that in FIG. 8 to FIG. 10.

<Configuration of Coil Device 101>

Referring to FIG. 2 to FIG. 7, coil device 101 in the present embodiment is an example of coil device 101 as a transformer included in power conversion device 1 shown in FIG. 1. Coil device 101 includes support 40. Support 40 is a part of a housing for the entire power conversion device 1 including coil device 101. In actuality, for example, the members excluding support 40 in FIG. 2 are arranged so as to be accommodated in the interior of a box-shaped housing. However, the entire housing is not illustrated to make the drawings more visible. Here, only a portion of support 40 in the shape of a flat plate that is the lowermost portion in the Z direction of the housing is illustrated and used in the following description.

Support 40 may be a cooler of the housing including this. The entire housing including support 40 is shaped like, for example, a rectangular parallelepiped box. Support 40 is made of metal and plays a role of accommodating each member and also plays a role of a cooler. That is, the following members are attached to support 40 in a region excluding the region in which coil device 101 shown in FIG. 2, for example, is arranged. Input terminal 110, output terminal 111, switching elements 7*a* to 7*d*, diodes 8*a* to 8*d*, and capacitors 9*a* and 9*b* are attached to support 40. The ground of power conversion device 1 is connected to support 40.

Core 10 includes an upper core 10A and a lower core 10B and these are combined so as to be meshed to form a single core 10. Upper core 10A and lower core 10B contain a magnetic substance. As shown in FIG. 2, three cores 10 each having a combination of upper core 10A and lower core 10B are spaced apart from each other and aligned in the X direction that is the longitudinal direction of first coil 20 and second coil 21.

Figure 11:
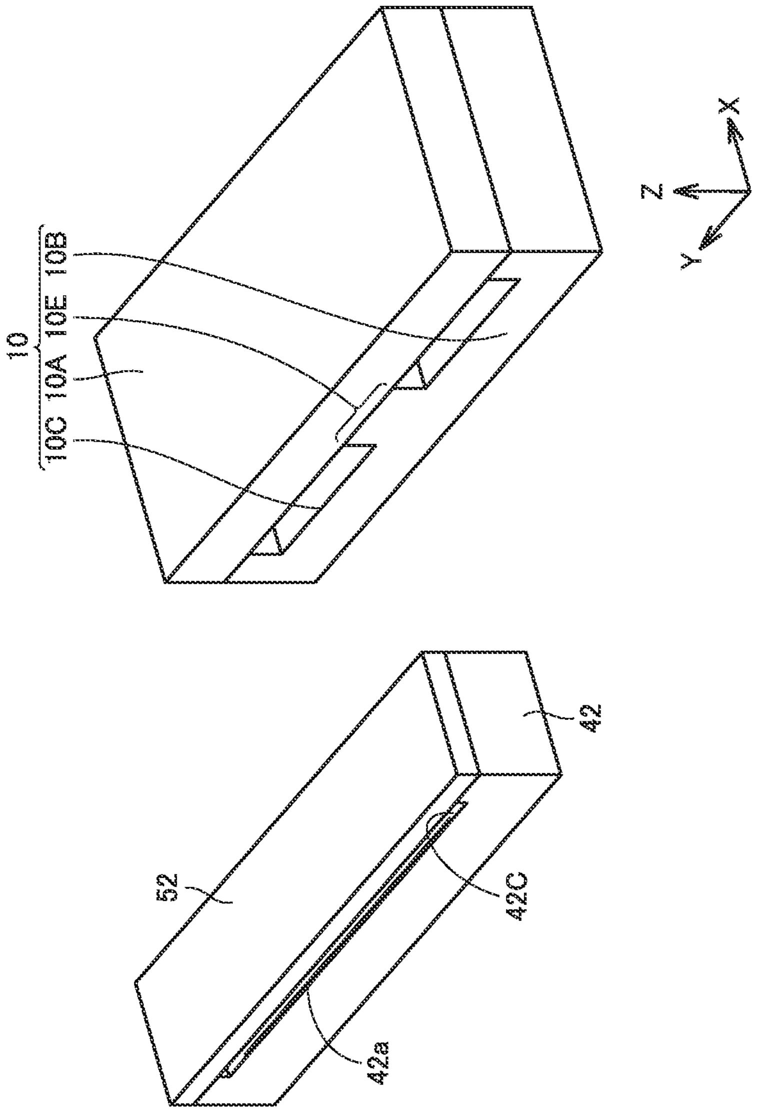
FIG. 11 is a schematic perspective view showing a core, a fixing member, and a protruding member extracted from the coil device in FIG. 2.

FIG. 11 is a schematic perspective view showing the core, the fixing member, and the protruding member extracted from the coil device in FIG. 2. Referring to FIG. 2 and FIG. 11, upper core 10A has a shape of the letter I (I shape), and lower core 10B has, for example, a shape of the letter E (E shape). Lower core 10B therefore has two cavities 10C spaced apart from each other in the Y direction between upper core 10A and lower core 10B when its uppermost surface meshes with upper core 10A. The body of core 10 is not arranged in cavities 10C. Two cavities 10C extend so as to penetrate the whole of each core 10 with respect to the X direction. As shown in FIG. 2, FIG. 6, FIG. 7, and FIG. 11, wound portion 10E is arranged between two cavities 10C aligned in the Y direction. As shown in FIG. 6, wound portion 10E is a portion formed in the body of lower core 10B and around which first coil 20 and second coil 21 turning on the XY plane are wound. In other words, wound portion 10E is a part of lower core 10B. Since first coil 20 and second coil 21 penetrate two cavities 10C in the X direction, first coil 20 and second coil 21 are wound around wound portion 10E sandwiched between two cavities 10C. Since the entire laminated coil 30 penetrates two cavities 10C, not only first coil 20 and second coil 21 but also first insulating member 32 and third insulating members 31 and 33 also penetrate two cavities 10C.

Core 10 in FIG. 2 and FIG. 11 has EI shape including the I-shaped upper core 10A and the E-shaped lower core 10B. However, core 10 is not limited to this shape and may be, for example, in EE shape or UU shape. However, for example, core 10 cannot have II shape in which both of upper core 10A and lower core 10B have I shape. This is because in this case, cavity 10C is not formed when upper core 10A and lower core 10B are meshed, and the coil device 101 that is a transformer (see FIG. 1) does not function. That is, when upper core 10A and lower core 10B are meshed, cavity 10C need to be formed therebetween. First coil 20 and second coil 21 turning in the X direction penetrate cavity 10C to achieve the function as coil device 101 as a transformer.

For example, a not-shown cover is arranged on the upper side in the Z direction of upper core 10A. Upper core 10A is pushed toward support 40 on the lower side in the Z direction, for example, by a not-shown spring or a plate fixed to the core. Lower core 10B is pushed toward support 40 on the lower side in the Z direction by the weight of upper core 10A. In the present embodiment, core 10 is thus mounted so as to be fixed on a surface of support 40.

However, laminated coil 30 is not necessarily in contact with upper core 10A or lower core 10B. In production, laminated coil 30 is installed so as to be not in contact with the surfaces of upper core 10A and lower core 10B but spaced apart from these surfaces. This is shown in FIG. 4 and FIG. 5 in which there is a gap between laminated coil 30 and upper core 10A and between laminated coil 30 and lower core 10B. However, laminated coil 30 may be in contact with upper core 10A or lower core 10B. When being in contact in this way, core 10 and laminated coil 30 achieve a homogeneous temperature. However, in this case, first coil 20 and second coil 21 included in laminated coil 30 need to be electrically insulated from core 10 reliably.

As shown in FIG. 2, FIG. 3, and FIG. 5, in total, two protruding members 42 are arranged on the outside of three cores 10 with respect to the X direction, that is, on the positive side and the negative side in the X direction of three cores 10. Each protruding member 42 is spaced apart from three cores 10 in the X direction. Protruding member 42 may be wider or narrower than core 10 with respect to the X direction or may have the same width as core 10. Protruding member 42 extends with a dimension equivalent to core 10 with respect to the Y direction. However, protruding member 42 has a relatively elongated shape in a two-dimensional view. Protruding member 42 is fixed to support 40. More specifically, protruding member 42 is fixed to, for example, the upper-side surface of support 40. Protruding member 42 may be formed integrally with support 40. However, protruding member 42 may be formed as a separate body from support 40, and they may be fixed to each other, for example, by bonding. Protruding member 42 may be integrated with a portion of the housing excluding support 40 or may be fixed to a portion of the housing by bonding or the like.

At positions overlapping with protruding members 42 in a two-dimensional view, in total, two fixing members 52 are arranged, each spaced apart from the corresponding protruding member 42 in the Z direction. Specifically, each fixing member 52 is arranged immediately above protruding member 42 in the Z direction. Furthermore, on the upper-side surface in the Z direction of protruding member 42, a heat transfer member 42*a* is placed adjacent to laminated coil 30 and in contact with laminated coil 30. Heat transfer member 42*a* is considered to be included in protruding member 42. Therefore "heat transfer member 42*a* is in contact with laminated coil 30" is considered as "protruding member 42 is in contact with laminated coil 30". Heat transfer member 42*a* may have substantially the same planar shape as protruding member 42 as long as it is at least arranged so as to be sandwiched in a region between the lowermost surface of laminated coil 30 and the uppermost surface of protruding member 42. The region between the lowermost surface of laminated coil 30 and the uppermost surface of protruding member 42 corresponds to an interior region of cavity 42C described later as shown in FIG. 3.

Fixing member 52 is arranged to fix laminated coil 30 to the lower side, that is, toward protruding member 42. It is therefore preferable that fixing member 52 is a flat plate having substantially the same planar shape as protruding member 42. Specifically, fixing member 52 has a relatively elongated planar shape having a narrow width with respect to the X direction and extending with a dimension equivalent to core 10 with respect to the Y direction.

As shown in FIG. 2 and FIG. 3, fixing member 52 is fixed to protruding member 42 or support 40 on its lower side, for example, by screws 80. This is for fixing member 52 to press laminated coil 30 toward support 40 on the lower side in the Z direction by tightening force of screws 80. However, fixing member 52 is fixed to protruding member 42 or support 40 on its lower side with laminated coil 30 and heat transfer member 42*a* interposed. As shown in FIG. 5, therefore, in laminated coil 30, the lower surface of insulating member 33 that is the lowermost surface of the whole is in contact with protruding member 42 with heat transfer member 42*a* interposed. On the other hand, in laminated coil 30, the upper surface of insulating member 31 that is the uppermost surface of the whole is in contact with fixing member 52. In this way, laminated coil 30 is sandwiched and fixed between fixing member 52 and protruding member 42.

Laminated coil 30 therefore is sandwiched in contact with fixing member 52 and heat transfer member 42*a*. That is, the lower surface of insulating member 33 of laminated coil 30 is in surface contact with heat transfer member 42*a*, and the upper surface of insulating member 31 of laminated coil 30 is in surface contact with fixing member 52. Furthermore, heat transfer member 42*a* is in surface contact with protruding member 42. Hence, laminated coil 30 is firmly pressed and fixed by fixing member 52 and protruding member 42 including heat transfer member 42*a* from above and below. On the other hand, as shown in FIG. 5 above, upper core 10A and lower core 10B are not necessarily in contact with laminated coil 30, and a gap may be formed. In this way, fixing member 52 and heat transfer member 42*a* differ in configuration from upper core 10A and lower core 10B in that they need to be in contact with laminated coil 30.

As shown in FIG. 11, fixing member 52 has I shape, and protruding member 42 has, for example, the C shape. That is, when fixing member 52 and protruding member 42 are meshed, one cavity 42C is formed therebetween. Cavity 42C is arranged substantially at the same Y coordinate position as two cavities 10C of core 10 and wound portion 10E therebetween and is formed to extend in the entire protruding member 42 with respect to the X direction. Thus, first coil 20 and second coil 21 turned to penetrate two cavities 10C of core 10 are turned to penetrate cavity 42C. However, protruding member 42 also may have E shape in which two cavities having the same shape can be formed.

As described later, heat transfer member 42*a* is formed of a material having flexibility or a material having fluidity. Hence, the pressing force downward by tightening of screws 80 compresses heat transfer member 42*a*. As long as heat transfer member 42*a* has substantially the same shape as protruding member 42, heat transfer member 42*a* may be deformed so as to be continuous from the bottom surface to the side surface of the inner wall of cavity 42C and in contact with the inner wall surface of cavity 42C so as to follow the shape of the inner wall surface, but heat transfer member 42*a* need not be in contact with the side surface of the inner wall of cavity 42C. As shown in FIG. 3, when heat transfer member 42*a* is originally arranged only in a region between the lowermost surface of laminated coil 30 and the uppermost surface of protruding member 42, heat transfer member 42*a* is arranged only on the bottom surface of the inner wall of cavity 42C.

Although not shown in the drawings, the heat transfer member may also be sandwiched between fixing member 52 and the upper surface of insulating member 31 of laminated coil 30. This heat transfer member is arranged in a region adjacent to and in contact with laminated coil 30 and considered to be included in fixing member 52. Therefore "the heat transfer member adjacent to fixing member 52 is in contact with laminated coil 30" is considered as "fixing member 52 is in contact with laminated coil 30". Conversely, the heat transfer member is not sandwiched between protruding member 42 and laminated coil 30 but may be sandwiched only between fixing member 52 and laminated coil 30. Also in this case, the heat transfer member is considered to be included in a part of fixing member 52. As described above, at least one of protruding member 42 and fixing member 52 further has a heat transfer member arranged adjacent to and in contact with laminated coil 30.

<Material and Properties>

Second insulating member 60 is formed of any material that has electrical insulating properties. More specifically, second insulating member 60 is formed of any material that can suppress contact and short-circuiting between turns, between first turn 20A and second turn 20B and between first turn 21A and second turn 21B. Specifically, second insulating member 60 may be formed of one selected from the group consisting of glass fiber reinforced epoxy resin, phenolic resin, polyphenylene sulfide (PPS), and polyether ether ketone. Alternatively, second insulating member 60 may be formed of one selected from the group consisting of polyethylene terephthalate (PET), polyimide (PI), and aramid (wholly aromatic polyamide) fibers. Alternatively, second insulating member 60 may be formed of a ceramic material such as aluminum oxide ($Al_2O_3$) or aluminum nitride (AlN).

When high rigidity is not required, second insulating member 60 may be formed of a silicone rubber sheet or a polyurethane rubber sheet. Alternatively, when high rigidity is not required, second insulating member 60 may be formed of silicone gel, silicone grease, or silicone adhesive. That is, second insulating member 60 may be in a film form.

It is preferable that support 40 has a thermal conductivity of 0.1 W/(m·K) or more. However, it is more preferable that support 40 has a thermal conductivity of 1.0 W/(m·K) or more. Among these, it is further preferable that support 40 has a thermal conductivity of 10.0 W/(m·K) or more.

It is preferable that support 40 is formed of a material having rigidity. Specifically, support 40 is formed of a metal material selected from the group consisting of copper (Cu), aluminum (Al), iron (Fe), iron alloys such as SUS304, copper alloys such as phosphor bronze, and aluminum alloys such as ADC12. Alternatively, support 40 may be formed of a resin material containing a thermal conductive filler. Here, the resin material is, for example, one selected from the group consisting of polybutylene terephthalate (PBT), polyphenylene sulfide (PPS), and polyether ether ketone (PEEK). Except for iron, the material used for support 40 is preferably a nonmagnetic substance. When protruding members 42 are integrated with support 40, protruding members 42 are made of the same material as support 40. When protruding members 42 are separate from support 40, protruding members 42 may be made of the same material as support 40 or may be made of a material different from support 40. Support 40 is formed, for example, through a process selected from the group consisting of machining, die casting, forging, and molding using a mold.

The body of upper core 10A and lower core 10B (including wound portion 10E) is formed of, for example, a manganese zinc (Mn—Zn)-based ferrite core or a nickel zinc (Ni—Zn)-based ferrite core. However, upper core 10A and lower core 10B may be, for example, amorphous cores or iron dust cores. Amorphous cores are formed of iron-based amorphous alloy. Iron dust cores are formed by pressure-forming iron powder.

First coil 20 and second coil 21 included in laminated coil 30 are formed of a conductive material. Specifically, first coil 20 and second coil 21 are formed of one selected from the group consisting of copper, silver (Ag), gold (Au), tin (Sn), copper alloy, nickel (Ni) alloy, gold alloy, silver alloy, and tin alloy. First coil 20 and second coil 21 may be formed of different materials. It is preferable that the surfaces of first coil 20 and second coil 21 included in laminated coil 30 are plated with nickel, gold, silver, or the like.

Connection members 22A and 22B may be formed of the same material as first coil 20 or may be formed of a different material. Connection members 23A and 23B may be formed of the same material as second coil 21 or may be formed of a different material. Connection members 22A, 22B, 23A, and 23B are formed of a conductive material. Specifically, connection members 22A, 22B, 23A, and 23B are formed of one selected from copper, silver, gold, tin, iron, copper alloy, nickel alloy, gold alloy, silver alloy, tin alloy, and iron alloy.

First insulating member 32 and third insulating members 31 and 33 included in laminated coil 30 have a flat plate shape or a thin foil or film shape. First insulating member 32 and third insulating members 31 and 33 are formed of any material that has electrical insulating properties. Specifically, first insulating member 32 and third insulating members 31 and 33 are formed of, for example, polyethylene terephthalate (PET) or polyimide (PI) films or paper formed of aramid (wholly aromatic polyamide) fibers. Alternatively, first insulating member 32 and third insulating members 31 and 33 may be formed of one selected from the group consisting of glass fiber reinforced epoxy resin, phenolic resin, polyphenylene sulfide (PPS), and polyether ether ketone. Alternatively, first insulating member 32 and third insulating members 31 and 33 may be formed of a ceramic material such as aluminum oxide ($Al_2O_3$) or aluminum nitride (AlN).

Fixing members 52 are formed of a material having high rigidity. Specifically, fixing members 52 may be formed of any metal material selected from the group consisting of copper, aluminum, iron, iron alloys such as SUS304, copper alloys such as phosphor bronze, and aluminum alloys such as ADC12. Alternatively, fixing members 52 may be formed of a resin material containing a thermal conductive filler. Here, the resin material is, for example, one selected from the group consisting of polybutylene terephthalate, polyphenylene sulfide, and polyether ether ketone. Except for iron, the material used for fixing members 52 is preferably a nonmagnetic substance. Fixing members 52 are formed, for example, through a process selected from the group consisting of machining, die casting, forging, and molding using a mold.

Heat transfer member 42*a* has a thermal conductivity greater than first insulating member 32 and third insulating members 31 and 33. Under such a condition, heat transfer member 42*a* has a thermal conductivity of 0.1 W/(m·K) or more, specifically 1.0 W/(m·K) or more, more specifically 10.0 W/(m·K) or more.

Heat transfer member 42*a* may have high rigidity or may have high flexibility. Heat transfer member 42*a* may have high elasticity. Heat transfer member 42*a* may have electrical insulating properties. Heat transfer member 42*a* may have a thermal conductive filler inside. In a case where heat transfer member 42*a* has flexibility or fluidity, heat transfer member 42*a* is compressed when laminated coil 30 is pressed toward support 40. Thus, heat transfer member 42*a* may be deformed and come into direct contact with first coil 20 and second coil 21. Furthermore, heat transfer member 42*a* may be in contact with upper core 10A and lower core 10B.

The material that forms heat transfer member 42*a* is as follows. It is preferable that heat transfer member 42*a* is formed of one of a material such as silicone or urethane and a resin material such as epoxy or urethane. Alternatively, heat transfer member 42*a* may be a resin material selected from the group consisting of acrylonitrile butadiene styrene (ABS), polybutylene terephthalate, polyphenylene sulfide, and phenol. Alternatively, heat transfer member 42*a* may be formed of one of a polymer material such as polyimide and a ceramic material such as aluminum oxide or aluminum nitride. Alternatively, heat transfer member 42*a* may be formed of a silicone rubber sheet or a polyurethane rubber sheet. Alternatively, heat transfer member 42*a* may be formed of silicone gel, silicone grease, or silicone adhesive.

Screws 80 are, for example, pan head screws or countersunk head screws and may be formed in any shape. Screws 80 may be, for example, rivets. When fixing members 52 are fixed to support 40 or protruding members 42 by a method such as adhesive, caulking, or welding, coil device 101 need not have screws 80.

<Operation Effect>

The background of the present embodiment will now be described, and then the operation effect of laminated coil 30 and coil device 101 in the present embodiment will be described.

The background of the present embodiment will be described first. A planar coil used for downsizing a transformer with a higher frequency has a larger area in a two-dimensional view. When a planar coil is used for a large-capacity transformer, a plurality of compact cores are arranged in order to prevent complication of sintering. As a result, the total planar area of the arranged compact cores increases, and consequently, the planar area of the planar coil increases. For example, in a transformer with a large capacity exceeding 10 kW, the dimension of core 10 in the longitudinal direction, that is, the Y direction in FIG. 2 is about 150 mm, and the dimension of laminated coil 30 in the longitudinal direction, that is, the X direction in FIG. 2 is about 400 mm.

A first problem in the background that leads to coil device 101 in FIG. 2 to FIG. 7 is as follows. In coil device 101 in FIG. 2 to FIG. 7, it is assumed that second insulating members 60 are not arranged between first turn 20A and second turn 20B in first coil 20 and between first turn 21A and second turn 21B in second coil 21. In this case, the following problem may arise when laminated coil 30 is formed by laminating first coil 20, second coil 21, first insulating member 32, and third insulating members 31 and 33. Specifically, in the lamination process, first turn 20A or second turn 20B in first coil 20 may be displaced in a direction along the XY plane. Furthermore, first coil 20 may be easily deformed due to the displacement. Due to this deformation, first turn 20A and second turn 20B adjacent to each other among a plurality of turns of first coil 20 come into contact with other and be short-circuited. Based on the same point of view as described above, first turn 21A and second turn 21B adjacent to each other among a plurality of turns of second coil 21 may come into contact with each other and be short-circuited. For example, if first turn 20A and second turn 20B come into contact with each other and are short-circuited, first coil 20 operates as if it did not have two turns although actually it has two turns. This is applicable to second coil 21. This causes inconvenience of failing to fulfill the desired function of coil device 101.

A second problem in the background that leads to coil device 101 in FIG. 2 to FIG. 7 is as follows. In coil device 101 in FIG. 2 to FIG. 7, both ends in the X direction of laminated coil 30 are fixed so as to be sandwiched between protruding member 42 and heat transfer member 42*a*, and fixing member 52. When coil device 101 vibrates during operation, laminated coil 30 is deformed, and the tacky layer or the adhesive layer affixed to the surface of each member in laminated coil 30 peels off. As a result, the constraint on first coil 20 or second coil 21 by the tacky layer or the adhesive layer is removed in laminated coil 30. First coil 20 or second coil 21 then may be deformed freely. Due to this deformation, first turn 20A and second turn 20B adjacent to each other among a plurality of turns of first coil 20 may come into contact with other and be short-circuited, in the same manner as the first problem. This is applicable to second coil 21.

In view of the foregoing problems, the following configuration is employed in the present embodiment. The configuration of the present embodiment and the operation effect achieved by the configuration will now be described.

Laminated coil 30 according to the present disclosure includes first coil 20 and second coil 21 as planar coils, and first insulating member 32. A plurality of planar coils are arranged in the first direction intersecting the first surface that is the main surface along the XY plane, that is, in the Z direction. As used herein "a plurality of planar coils are arranged" means that, for example, two such as first coil 20 and second coil 21 are arranged. Laminated coil 30 includes first insulating member 32 in a film form arranged between first coil 20 and second coil 21 that are a pair of planar coils adjacent to each other in the Z direction among a plurality of planar coils. At least one of first coil 20 and second coil 21 that are a plurality of planar coils is wound to have a plurality of turns spaced apart from each other in the second direction along the first surface, that is, a direction along the XY plane. Second insulating member 60 is arranged between a plurality of turns adjacent to each other in the second direction in at least one of the planar coils, that is, at least one of first coil 20 and second coil 21.

Coil device 101 according to the present disclosure includes laminated coil 30 according to the present disclosure described above and cores 10. A plurality of cores 10 are spaced apart from each other and aligned in the longitudinal direction of laminated coil 30. Laminated coil 30 is arranged so as to be wound around a plurality of cores 10.

Power conversion device 1 according to the present disclosure includes coil device 101 according to the present disclosure described above. Coil device 101 includes support 40, protruding member 42, and fixing member 52. Protruding member 42 is fixed to support 40. Fixing member 52 is arranged at a position overlapping with protruding member 42 in a two-dimensional view. Laminated coil 30 is sandwiched and fixed between fixing member 52 and protruding member 42 so as to be in contact with fixing member 52 and protruding member 42.

Since second insulating member 60 is arranged between adjacent turns of first coil 20 and second coil 21, the distance along the second direction between the turns is ensured. For example, the distance between first turn 20A and second turn 20B in first coil 20 is kept. For example, the distance between first turn 21A and second turn 21B in second coil 21 is kept. The contact and short-circuiting between the first turn and the second turn adjacent to each other therefore can be suppressed even when first coil 20 or second coil 21 is displaced in a planar direction or deformed due to vibration. This can reduce the possibility that the substantial number of turns of first coil 20 and second coil 21 is reduced and the desired functions of laminated coil 30 and coil device 101 including the same are impaired. That is, laminated coil 30 that has the designed number of turns of coils and stably achieves the designed electrical characteristics can be provided.

It is preferable that second insulating member 60 described above is in contact with both of first turn 20A and second turn 20B in first coil 20. Similarly, it is preferable that second insulating member 60 is in contact with both of first turn 21A and second turn 21B in second coil 21. Laminated coil 30 heats due to energization of first coil 20 and second coil 21 during operation of coil device 101. Because of the configuration above, the temperatures of first turn 20A and second turn 20B in first coil 20 can be homogenized, so that both have substantially the same temperature. Similarly, because of the configuration above, the temperatures of first turn 21A and second turn 21B in second coil 21 can be homogenized, so that both have substantially the same temperature. Accordingly, variation in temperature inside laminated coil 30 can be reduced.

However, second insulating member 60 may be arranged between first turn 20A and second turn 20B so as to be spaced apart from and not in contact with at least one of these. Second insulating member 60 may be arranged between first turn 21A and second turn 21B so as be spaced apart from and not in contact with at least one of these.

In laminated coil 30 described above, at least one of first coil 20 and second coil 21 that are a plurality of planar coils may have a linear portion in a two-dimensionally view. In large-capacity coil device 101, laminated coil 30 is wound around a plurality of cores 10. Coil device 101 in the present embodiment therefore has a coil having a linear portion extending in the X direction and the Y direction in FIG. 6 and the like.

In laminated coil 30 described above, it is preferable that a plurality of second insulating members 60 are arranged between first turn 20A, 21A and second turn 20B, 21B that are a plurality of turns so as to be spaced apart from each other in the circumferential direction in which laminated coil 30 is wound. The portion of the spacing in the circumferential direction is neither filled with an adhesive nor filled with a resin for molding. That is, the portion of the spacing in the circumferential direction is a cavity.

In laminated coil 30 described above, it is preferable that a pair of third insulating members 31 and 33 are arranged to sandwich first coil 20, second coil 21, and second insulating member 60 as a plurality of planar coils, at one end that is on the upper-side end and the other end that is the lower-side end in the Z direction. At least a part of second insulating member 60 is sandwiched between third insulating members 31 and 33. Thus, the insulating members are arranged on the uppermost portion and the lowermost portion of the entire laminated coil 30. This configuration can suppress short-circuiting between laminated coil 30 and another member in coil device 101.

In power conversion device 1 described above, it is preferable that at least one of protruding member 42 and fixing member 52 of coil device 101 has heat transfer member 42*a* arranged adjacent to and in contact with laminated coil 30. When current flows through first coil 20 and second coil 21 and coil device 101 operates, heat is generated due to energy loss in cores 10. The generated heat in cores 10 is transferred, for example, from lower core 10B to support 40. The heat transferred to support 40 is dissipated to its underside. The sandwiched heat transfer member 42*a* can enhance this heat dissipation effect.

Second Embodiment

<Configuration of Laminated Coil 30>

Figure 12:
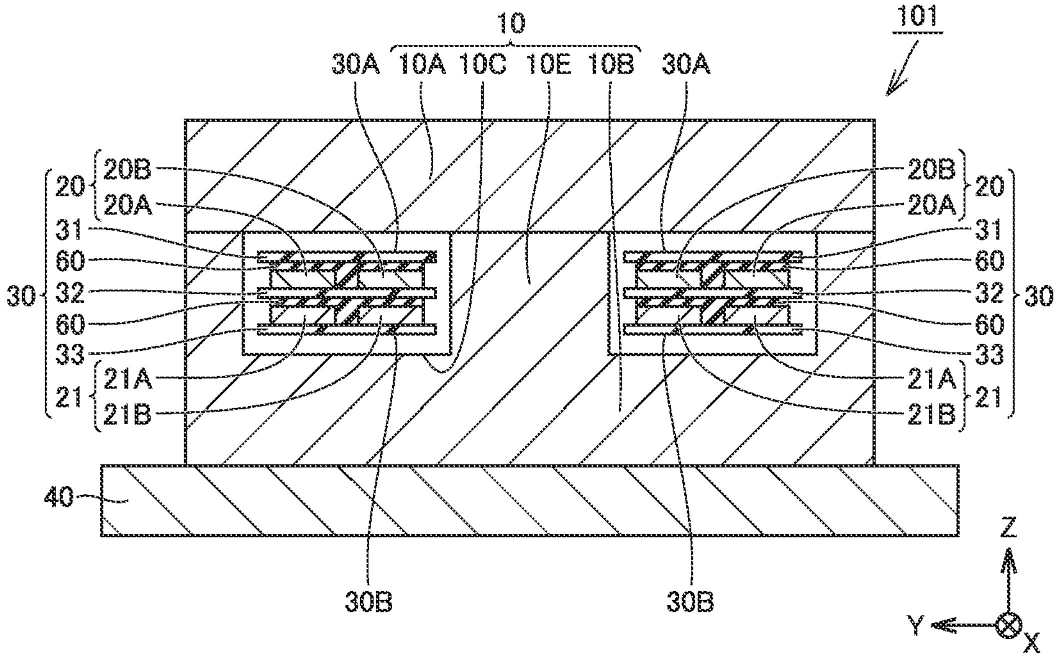
FIG. 12 is a schematic cross-sectional view of the coil device in FIG. 3 in a portion along line A-A in FIG. 3 in a second embodiment.

FIG. 12 is a schematic cross-sectional view of the coil device in FIG. 3 in a portion along line A-A in FIG. 3 in a second embodiment. In other words, FIG. 12 is a cross-sectional view corresponding to FIG. 4 in the first embodiment. Referring to FIG. 12, coil device 101 in the present embodiment basically has a configuration similar to coil device 101 in FIG. 4 in the first embodiment. The same constituent element is denoted by the same reference sign and a description thereof will not be repeated as long as the configuration, function, and the like are similar to those in the first embodiment. This is applicable to the following embodiments.

Coil device 101 in the present embodiment includes first coil 20 and second coil 21 as a plurality of planar coils, in the same manner as the first embodiment. Second insulating member 60 is arranged as a first region between first turn 20A and second turn 20B in first coil 20 with respect to the Y direction in FIG. 12. Second insulating member 60 is also arranged as a second region between first coil 20 and third insulating member 31 with respect to the Z direction. Second insulating member 60 is arranged to be continuous from the first region to the second region. Thus, second insulating member 60 in the first region and second insulating member 60 in the second region are integrated and serve as a single second insulating member 60. Similarly, second insulating member 60 is arranged as a first region between first turn 21A and second turn 21B in second coil 21 with respect to the Y direction in FIG. 12. Second insulating member 60 is also arranged as a second region between second coil 21 and first insulating member 32 with respect to the Z direction. Second insulating member 60 is arranged to be continuous from the first region to the second region. Thus, second insulating member 60 in the first region and second insulating member 60 in the second region are integrated and serve as a single second insulating member 60. Second insulating member 60 continuous between the first region and the second region and integrated is shaped like the letter T in the cross-sectional view in FIG. 12.

The T shape of second insulating member 60 in FIG. 12 is in any orientation. Specifically, for example, second insulating member 60 in the present embodiment may be vertically inverted compared with second insulating member 60 shown in the cross-sectional view in FIG. 12. Specifically, for example, second insulating member 60 is arranged as a first region between first turn 20A and second turn 20B in first coil 20 with respect to the Y direction in FIG. 12. Second insulating member 60 is also arranged as a second region between first coil 20 and first insulating member 32 with respect to the Z direction. Second insulating member 60 is arranged to be continuous from the first region to the second region. Similarly, second insulating member 60 is arranged as a first region between first turn 21A and second turn 21B in second coil 21 with respect to the Y direction in FIG. 12. Second insulating member 60 is also arranged as a second region between second coil 21 and third insulating member 33 with respect to the Z direction. Second insulating member 60 is arranged to be continuous from the first region to the second region. Second insulating member 60 may be configured in such a manner.

Second insulating member 60 in FIG. 12 covers the entire first surface of at least one of first coil 20 and second coil 21. However, the embodiment is not limited to such a manner, and second insulating member 60 may cover only a part of the first surface. Second insulating member 60 in FIG. 12 is shaped like T in cross section. However, the embodiment is not limited thereto, and second insulating member 60 is arranged at least at a part of the first region and the second region. For example, second insulating member 60 in FIG. 12 may be shaped like L in cross section.

In FIG. 12, both of second insulating member 60 sandwiched between first turn 20A and second turn 20B in first coil 20 and second insulating member 60 sandwiched between first turn 21A and second turn 21B in second coil 21 are continuous from the first region to the second region and integrated. However, the embodiment is not limited thereto, and only one of second insulating member 60 sandwiched between first turn 20A and second turn 20B in first coil 20 and second insulating member 60 sandwiched between first turn 21A and second turn 21B in second coil 21 may be continuous from the first region to the second region and integrated.

In FIG. 12, second insulating member 60 in the second region is in contact with both of first coil 20 and third insulating member 31 with respect to the Z direction. The second insulating member in the second region is in contact with both of second coil 21 and first insulating member 32 with respect to the Z direction. Such a configuration may be employed. However, second insulating member 60 in the second region may be spaced apart and not in contact with at least one of first coil 20 and third insulating member 31 with respect to the Z direction. Second insulating member 60 in the second region may be spaced apart and not in contact with at least one of second coil 21 and first insulating member 32 with respect to the Z direction. Second insulating member 60 in the first region is similar to that in the first embodiment.

<Operation Effect>

Laminated coil 30 in the present embodiment includes first coil 20 and second coil 21 as a plurality of planar coils. Second insulating member 60 is arranged to be continuous from between a plurality of turns to between at least one of first coil 20 and second coil 21 and one of first insulating member 32 and third insulating members 31 and 33. Such a configuration may be employed.

Such a configuration can suppress contact and short-circuiting between adjacent turns, for example, when at least one of first coil 20 and second coil 21 is deformed not only in a direction along the XY plane but also in the Z direction. The reason is that contact and short-circuiting between adjacent turns are prevented because second insulating member 60 is sandwiched between adjacent turns with respect to the Z direction.

In the present embodiment, second insulating member 60 is arranged in the second region, that is, between second coil 21 and first insulating member 32 as shown in FIG. 12. Thus, both of first insulating member 32 and second insulating member 60 are sandwiched between first coil 20 and second coil 21. In this respect, the present embodiment differs from the first embodiment in which only first insulating member 32 is sandwiched between first coil 20 and second coil 21.

In FIG. 4 in the first embodiment, capacitance that is stray capacitance including first coil 20 and second coil 21 and first insulating member 32 therebetween occurs. Due to this stray capacitance, the waveforms of current and voltage output by coil device 101 may be different from a desired waveform. However, in FIG. 12 in the present embodiment, first insulating member 32 and second insulating member 60 are sandwiched between first coil 20 and second coil 21. Here, the permittivity of second insulating member 60 is set to be different from the permittivity of first insulating member 32, and the thickness in the Z direction of second insulating member 60 is changed. Thus, the stray capacitance including first coil 20, second coil 21, and the insulating member therebetween can be changed to a desired magnitude. The waveforms of current and voltage output by coil device 101 thus can be controlled to achieve a desired waveform.

Third Embodiment

<Configuration of Laminated Coil 30>

Figure 13:
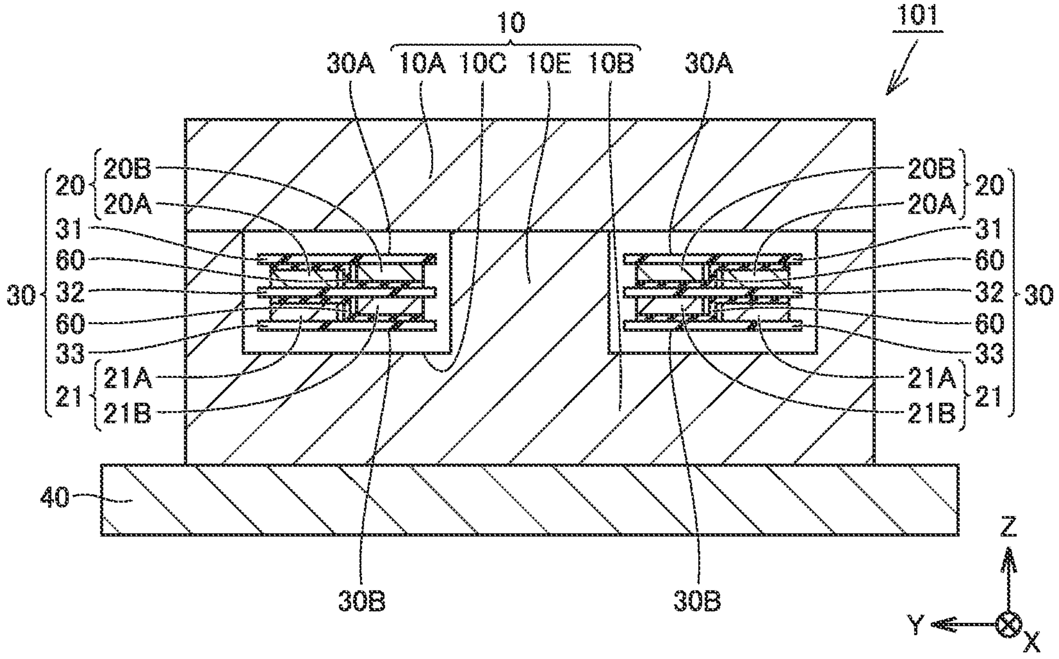
FIG. 13 is a schematic cross-sectional view of the coil device in FIG. 3 in a portion along line A-A in FIG. 3 in a third embodiment.

FIG. 13 is a schematic cross-sectional view of the coil device in FIG. 3 in a portion along line A-A in FIG. 3 in a third embodiment. In other words, FIG. 13 is a cross-sectional view corresponding to FIG. 4 in the first embodiment. Referring to FIG. 13, in coil device 101 in the present embodiment, second insulating member 60 is arranged as a first region between first turn 20A and second turn 20B in first coil 20 with respect to the Y direction in FIG. 13. Second insulating member 60 is also arranged as a second region between first turn 20A of first coil 20 and third insulating member 31 with respect to the Z direction. Second insulating member 60 is further arranged as a third region between second turn 20B of first coil 20 and first insulating member 32 with respect to the Z direction. Second insulating member 60 is arranged to be continuous from the first region to the second region and continuous from the first region to the third region. Thus, second insulating member 60 in the first region, second insulating member 60 in the second region, and second insulating member 60 in the third region are integrated and serve as a single second insulating member 60. Second insulating member 60 continuous between the first region, the second region, and the third region and integrated is shaped like the letter S in the cross-sectional view in FIG. 13.

Similarly, in coil device 101 in the present embodiment, second insulating member 60 is arranged as a first region between first turn 21A and second turn 21B in second coil 21 with respect to the Y direction in FIG. 13. Second insulating member 60 is also arranged as a second region between first turn 21A of second coil 21 and first insulating member 32 with respect to the Z direction. Second insulating member 60 is further arranged as a third region between second turn 21B of second coil 21 and third insulating member 33 with respect to the Z direction. Second insulating member 60 is arranged to be continuous from the first region to the second region and continuous from the first region to the third region. Thus, second insulating member 60 in the first region, second insulating member 60 in the second region, and second insulating member 60 in the third region are integrated and serve as a single second insulating member 60. Second insulating member 60 continuous between the first region, the second region, and the third region and integrated is shaped like the letter S in the cross-sectional view in FIG. 13.

Although not shown in the drawing, the present embodiment may be configured in the following manner as a modification. For example, in coil device 101 in the present embodiment, second insulating member 60 is arranged as a first region between first turn 20A and second turn 20B in first coil 20 with respect to the Y direction in FIG. 13. Second insulating member 60 is also arranged as a second region between second turn 20B of first coil 20 and third insulating member 31 with respect to the Z direction. Second insulating member 60 is further arranged as a third region between first turn 20A of first coil 20 and first insulating member 32 with respect to the Z direction. Second insulating member 60 is arranged to be continuous from the first region to the second region and continuous from the first region to the third region. Thus, second insulating member 60 in the first region, second insulating member 60 in the second region, and second insulating member 60 in the third region are integrated and serve as a single second insulating member 60. Second insulating member 60 continuous between the first region, the second region, and the third region and integrated is shaped like the letter S in a cross-sectional view.

In coil device 101 in the present embodiment, second insulating member 60 is arranged as a first region between first turn 21A and second turn 21B in second coil 21 with respect to the Y direction in FIG. 13, in the same manner as described above. Second insulating member 60 is also arranged as a second region between second turn 21B of second coil 21 and first insulating member 32 with respect to the Z direction. Second insulating member 60 is further arranged as a third region between first turn 21A of second coil 21 and third insulating member 33 with respect to the Z direction. Second insulating member 60 is arranged to be continuous from the first region to the second region and continuous from the first region to the third region. Thus, second insulating member 60 in the first region, second insulating member 60 in the second region, and second insulating member 60 in the third region are integrated and serve as a single second insulating member 60. Second insulating member 60 continuous between the first region, the second region, and the third region and integrated is shaped like the letter S in a cross-sectional view. Such a manner may be employed.

As shown in FIG. 13, second insulating member 60 may be arranged between first turn 20A and second turn 20B so as to be spaced apart from and not in contact with at least one of these. Second insulating member 60 may be arranged between first turn 21A and second turn 21B so as to be spaced apart from and not in contact with at least one of these. However, even in this case, as shown in FIG. 13, it is preferable that second insulating member 60 is in contact with first coil 20, second coil 21, and the insulating member adjacent in the Z direction in the second region and the third region. It is more preferable that second insulating member 60 is arranged in contact with first turn 20A and second turn 20B and in contact with first turn 21A and second turn 21B.

In FIG. 13, the positions in the Z direction of first turn 20A and second turn 20B in first coil 20 are slightly different. Specifically, first turn 20A having second insulating member 60 on the upper side is arranged lower in the Z direction than second turn 20B having second insulating member 60 on the lower side. This is applicable to second coil 21. Specifically, first turn 21A having second insulating member 60 on the upper side is arranged lower in the Z direction than second turn 21B having second insulating member 60 on the lower side. First coil 20 and second coil 21 may be thus arranged.

<Operation Effect>

Laminated coil 30 in the present embodiment includes first coil 20 and second coil 21 as a plurality of planar coils. Second insulating member 60 is arranged in the first region between turns adjacent to each other in the second direction in at least one of first coil 20 and second coil 21. Second insulating member 60 is arranged in the second region between first turn 20A, 21A in at least one of first coil 20 and second coil 21 and one of the insulating members with respect to the Z direction. Second insulating member 60 is arranged in the third region between second turn 20B, 21B in at least one of first coil 20 and second coil 21 and the other insulating member with respect to the Z direction. Second insulating member 60 is shaped like the letter S, for example, continuous between the first region, the second region, and the third region and integrated.

According to the present embodiment, the effect of suppressing contact and short-circuiting between adjacent turns is even higher than in the second embodiment, for example, when at least one of first coil 20 and second coil 21 is deformed not only in a direction along the XY plane but also in the Z direction.

Fourth Embodiment

<Configuration of Laminated Coil 30>

Figure 14:
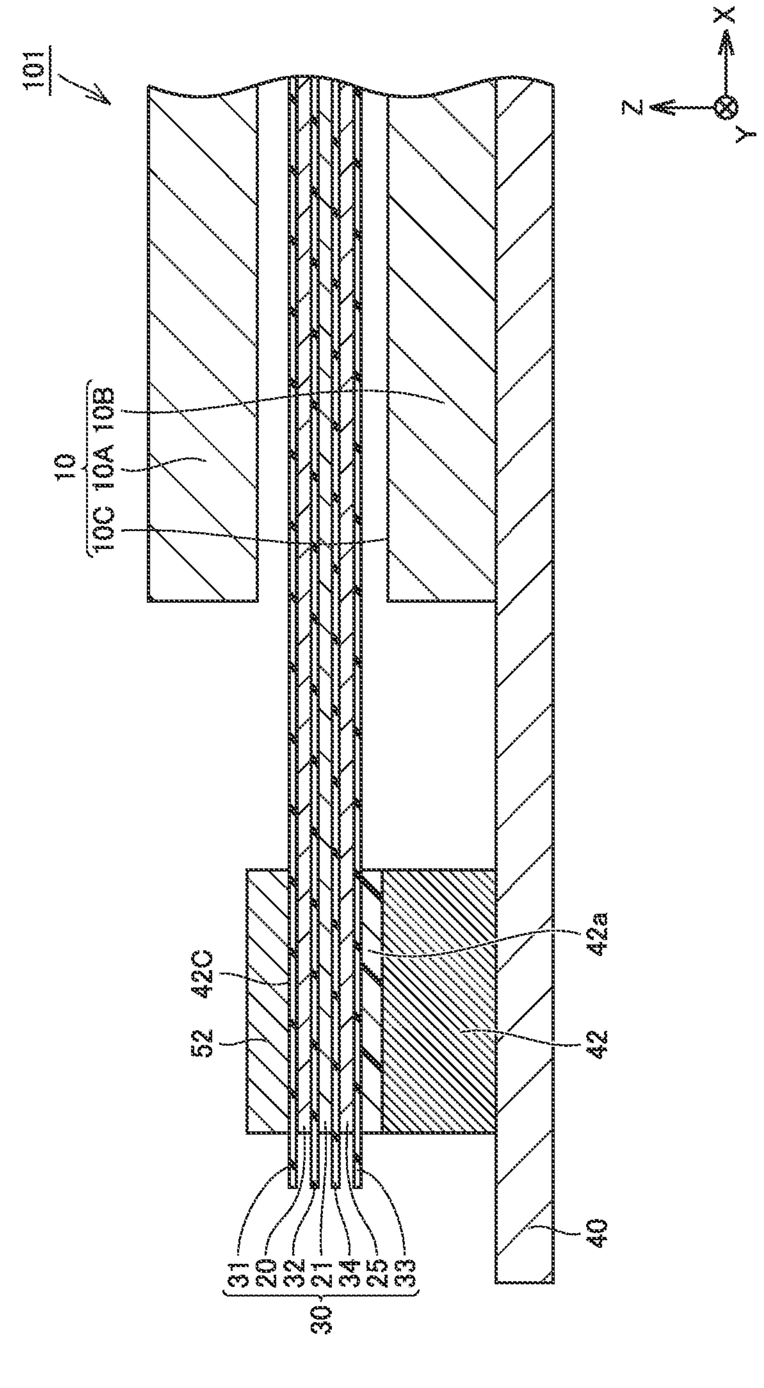
FIG. 14 is a schematic cross-sectional view of the coil device in FIG. 3 in a portion along line B-B in FIG. 3 in a fourth embodiment.

FIG. 14 is a schematic cross-sectional view of the coil device in FIG. 3 in a portion along line B-B in FIG. 3 in a fourth embodiment. In other words, FIG. 14 is a cross-sectional view corresponding to FIG. 5 in the first embodiment. Referring to FIG. 14, in coil device 101 in the present embodiment, three layers of coils are laminated in laminated coil 30. Specifically, in FIG. 14, first coil 20, second coil 21, and a second coil 25 are laminated as planar coils in laminated coil 30. In laminated coil 30, third insulating member 31, first coil 20, first insulating member 32, second coil 21, fourth insulating member 34, second coil 25, and third insulating member 33 are laminated in this order from the upper layer to the lower layer. Second coil 25 is a low voltage-side winding in coil device 101, similar to second coil 21. That is, second coil 21 and second coil 25 are electrically connected in parallel by third insulating member 33 and fourth insulating member 34. As described above, coil device 101 has two second coils 21 and 25.

<Operation Effect>

Coil device 101 in the present embodiment includes a plurality of at least one of the first coils and the second coils. Here, coil device 101 includes one first coil 20 and two second coils 21 and 25. That is, laminated coil 30 includes in total three or more planar coils. Such a configuration may be employed. The operation effect achieved by this configuration is as follows. For example, as shown in FIG. 14, because of two second coils 21 and 25 connected in parallel as secondary-side, that is, low voltage-side windings, a value of current flowing through each of second coils 21 and 25 can be reduced, and heat generation in the second coils can be suppressed. Furthermore, since second coil 25 having a high thermal conductivity is added to laminated coil 30 in addition to second coil 21, the temperature in laminated coil 30 can be homogenized. Furthermore, since second coil 25 having high rigidity is added in laminated coil 30, the rigidity of the entire laminated coil 30 increases, and vibration resistance of laminated coil 30 is further improved. This configuration can suppress contact and short-circuiting between turns adjacent to each other in a direction along the XY plane in first coil 20 and second coils 21 and 25.

Fifth Embodiment

<Configuration of Laminated Coil 30>

Figure 15:
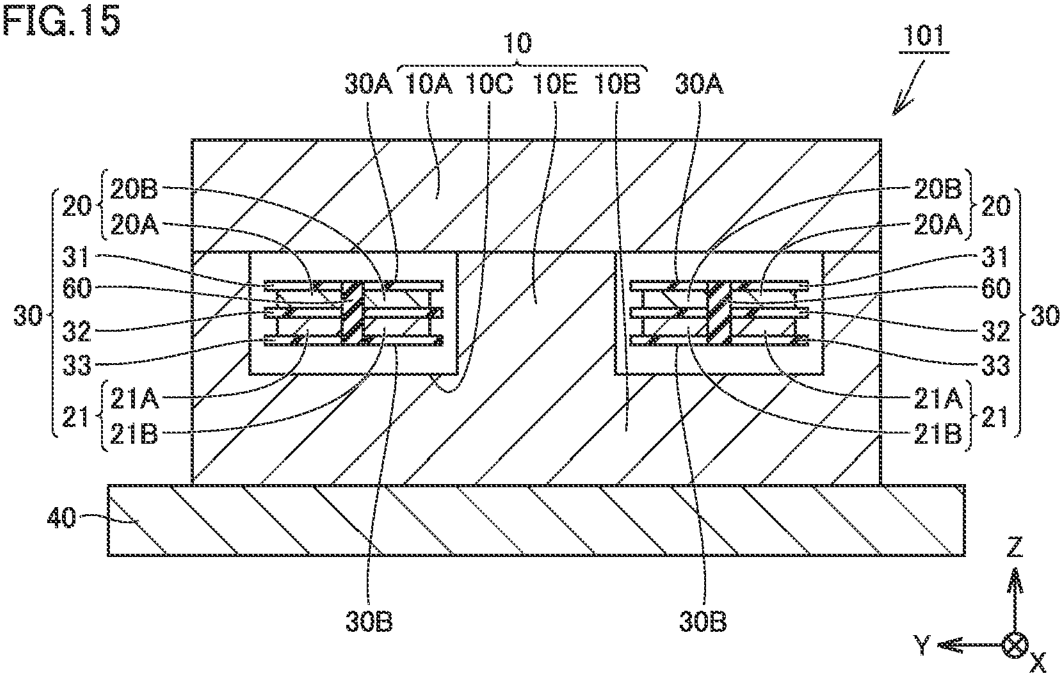
FIG. 15 is a schematic cross-sectional view of the coil device in FIG. 3 in a portion along line A-A in FIG. 3 in a fifth embodiment.

FIG. 15 is a schematic cross-sectional view of the coil device in FIG. 3 in a portion along line A-A in FIG. 3 in a fifth embodiment. In other words, FIG. 15 is a cross-sectional view corresponding to FIG. 5 in the first embodiment. Referring to FIG. 15, in laminated coil 30 in the present embodiment, second insulating member 60 is arranged between first turn 20A and second turn 20B in first coil 20 and between first turn 21A and second turn 21B in second coil 21. This second insulating member 60 extends to penetrate the entire laminated coil 30 with respect to the Z direction. More specifically, second insulating member 60 extends in laminated coil 30 including third insulating members 31 and 33 in the Z direction, from one surface 30A that is the uppermost surface of laminated coil 30 to the other surface 30B that is the lowermost surface. Second insulating member 60 thus penetrates third insulating members 31 and 33 and the entire laminated coil 30 including these in the Z direction. This second insulating member 60 extending in the Z direction passes between first turn 20A and second turn 20B and between first turn 21A and second turn 21B.

<Operation Effect>

In coil device 101 in the present embodiment, second insulating member 60 between a plurality of turns extends in laminated coil 30 so as to penetrate third insulating members 31 and 33 with respect to the Z direction, from one surface 30A to the other surface 30B. One surface 30A is a surface on the side opposite to the planar coil, that is, the upper side of third insulating member 31 on one end side that is the upper side of laminated coil 30. The other surface 30B is a surface on the side opposite to the planar coil, that is, the lower side of third insulating member 33 on the other end side that is the lower side of laminated coil 30. The planar coils are first coil 20 and second coil 21.

This configuration eliminates the need for simultaneously laminating second insulating member 60 when first coil 20, second coil 21, first insulating member 32, and third insulating members 31 and 33 are laminated in production of laminated coil 30. In other words, after first coil 20, second coil 21, first insulating member 32, and third insulating members 31 and 33 are laminated, second insulating member 60 can be inserted in the laminated members. During the insertion, second insulating member 60 is arranged to penetrate the laminated members.

In this configuration, first insulating member 32 and third insulating members 31 and 33 can be fixed by second insulating member 60. The operation effect similar to that in the first embodiment therefore can be achieved. Specifically, the contact and short-circuiting between the first turn and the second turn adjacent to each other can be suppressed even when first coil 20 or second coil 21 is displaced in a planar direction or deformed due to vibration. This can reduce the possibility that the substantial number of turns of first coil 20 and second coil 21 is reduced and the desired functions of laminated coil 30 and coil device 101 including the same are impaired.

Even in the present embodiment, it is preferable that second insulating member 60 is in contact with a member adjacent thereto in a direction along the XY plane. The operation effect similar to that in the first embodiment therefore can be achieved. Specifically, the temperatures of first turn 20A and second turn 20B in first coil 20 can be homogenized, so that both have substantially the same temperature. Similarly, because of the configuration above, the temperatures of first turn 21A and second turn 21B in second coil 21 can be homogenized, so that both have substantially the same temperature. Accordingly, variation in temperature inside laminated coil 30 can be suppressed.

Sixth Embodiment

<Configuration of Laminated Coil 30>

Figure 16:
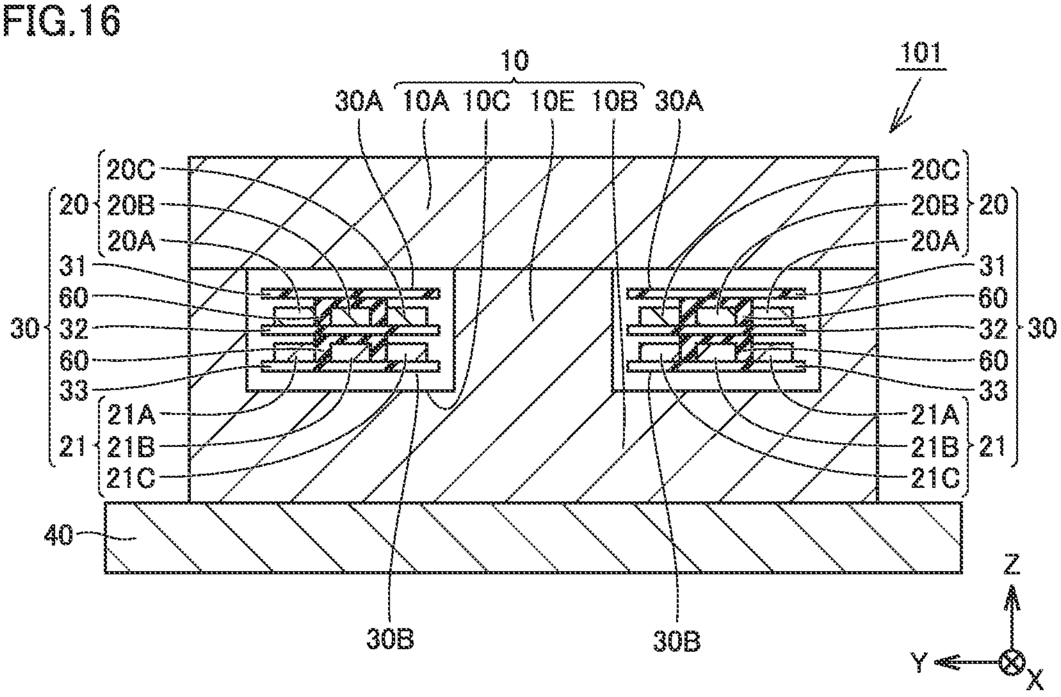
FIG. 16 is a schematic cross-sectional view of the coil device in FIG. 3 in a portion along line A-A in FIG. 3 in a sixth embodiment.
Figure 17:
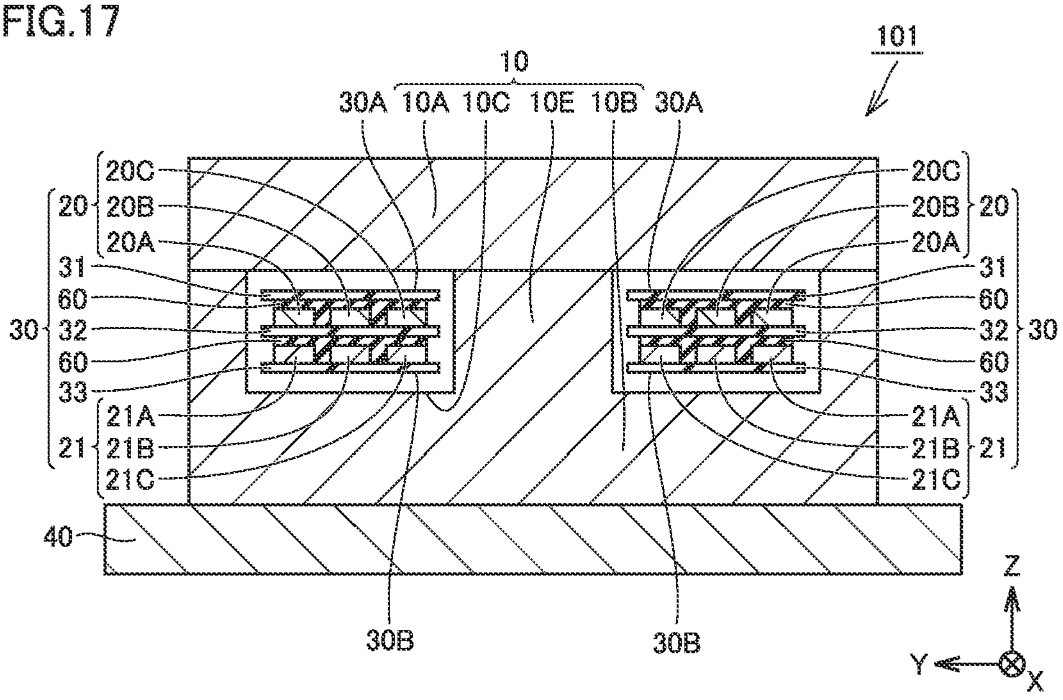
FIG. 17 is a schematic cross-sectional view of the coil device in FIG. 3 in a portion along line A-A in FIG. 3 in a modification to the sixth embodiment.

FIG. 16 is a schematic cross-sectional view of the coil device in FIG. 3 in a portion along line A-A in FIG. 3 in a sixth embodiment. FIG. 17 is a schematic cross-sectional view of the coil device in FIG. 3 in a portion along line A-A in FIG. 3 in a modification to the sixth embodiment. In other words, FIG. 16 and FIG. 17 are cross-sectional views corresponding to FIG. 4 in the first embodiment. Referring to FIG. 16, in coil device 101 in the present embodiment, first coil 20 of laminated coil 30 has first turn 20A, second turn 20B, and a third turn 20C. That is, first coil 20 has three turns. Similarly, second coil 21 has first turn 21A, second turn 21B, and a third turn 21C. That is, second coil 21 has three turns. Therefore, each of first coil 20 and second coil 21 has two regions each sandwiched between turns adjacent to each other in the second direction along the XY plane. In this respect, the present embodiment differs from laminated coil 30 in the first embodiment and the like in which the number of regions sandwiched between turns adjacent to each other in the second direction in first coil 20 and the like is one.

In the present embodiment, second insulating member 60 is arranged as two first regions between first turn 20A and second turn 20B and between second turn 20B and third turn 20C in first coil 20. Second insulating member 60 is also arranged as a second region between second turn 20B that is the central turn of three turns of first coil 20 and third insulating member 31. Second insulating member 60 is formed so as to be continuous between the two first regions and the second region and integrated. Similarly, in the present embodiment, second insulating member 60 is arranged as two first regions between first turn 21A and second turn 21B and between second turn 21B and third turn 21C in second coil 21. Second insulating member 60 is also arranged as a second region between second turn 21B that is the central turn of three turns of second coil 21 and first insulating member 32. Second insulating member 60 is formed so as to be continuous between the two first regions and the second region and integrated.

Second insulating member 60 in FIG. 16 covers only a first surface of second turn 20B of first coil 20. Second insulating member 60 in FIG. 16 also covers only a first surface of second turn 21B of second coil 21. However, the embodiment is not limited thereto, and, for example, second insulating member 60 may cover the first surfaces of first turn 20A and second turn 20B of first coil 20 and may cover the first surfaces of second turn 21A and second turn 21B of second coil 21. Alternatively, second insulating member 60 may cover the first surfaces of second turn 20B and third turn 20C of first coil 20 and may cover the first surfaces of second turn 21B and third turn 21C of second coil 21. Furthermore, second insulating member 60 may cover the first surfaces of first turn 20A and third turn 20C and may cover the first surfaces of first turn 21A and third turn 21C. Alternatively, referring to FIG. 17, second insulating member 60 may cover the entire first surface of first coil 20, that is, all of first turn 20A, second turn 20B, and third turn 20C. As shown in FIG. 17, second insulating member 60 may cover the entire first surface of second coil 21, that is, all of first turn 21A, second turn 21B, and third turn 21C.

Second insulating member 60 in FIG. 16 and FIG. 17 is arranged as a second region between first coil 20 and third insulating member 31 and between second coil 21 and first insulating member 32. Second insulating member 60 in FIG. 16 and FIG. 17 is in any orientation. Specifically, for example, second insulating member 60 in the present embodiment may be vertically inverted compared with second insulating member 60 in FIG. 16 and FIG. 17. Specifically, for example, second insulating member 60 may be arranged as a second region between first coil 20 and first insulating member 32 and between second coil 21 and third insulating member 33.

In FIG. 16 and FIG. 17, both of second insulating member 60 sandwiched between the turns of first coil 20 and second insulating member 60 sandwiched between the turns of second coil 21 are continuous from the first region to the second region and integrated. However, the embodiment is not limited thereto, and only one of second insulating member 60 sandwiched between the turns of first coil 20 and second insulating member 60 sandwiched between the turns of second coil 21 may be continuous from the first region to the second region and integrated.

In FIG. 16 and FIG. 17, both of first coil 20 and second coil 21 have three turns. However, the embodiment is not limited thereto, and in the present embodiment, only one of first coil 20 and second coil 21 may have three turns and the other may have only two turns. In the present embodiment, at least one of first coil 20 and second coil 21 may have four or more turns.

In FIG. 16 and FIG. 17, second insulating member 60 in the second region is in contact with each member adjacent in the Z direction, in the same manner as the second embodiment. Second insulating member 60 in the first region is in contact with each turn, in the same manner as the first embodiment. Second insulating member 60 may be in contact in this way but is not necessarily in contact. If second insulating member 60 is in contact with the adjacent member, the temperatures of the turns of first coil 20 and second coil 21 can be homogenized, so that they have substantially the same temperature, in the same manner as in the first embodiment and the like. Accordingly, variation in temperature inside laminated coil 30 can be reduced.

<Operation Effect>

In the present embodiment, at least one of first coil 20 and second coil 21 has three or more turns. Therefore, there are more corresponding regions than those in the first embodiment and the like in which first coil 20 and the like have only two turns. In the present embodiment, with more regions, the possibility of contact and short-circuiting of the coil between adjacent turns is higher than in the first embodiment and the like.

Then, in laminated coil 30 in the present embodiment, second insulating member 60 is arranged as a first region in all of the regions between two or more turns in at least one of first coil 20 and second coil 21 having three or more turns. Second insulating member 60 is also arranged as a second region between one of first coil 20 and second coil 21 and one of third insulating members 31 and 33 and first insulating member 32 adjacent in the Z direction. This second insulating member 60 is arranged so as to be continuous and integrated from each of the first regions to the second region.

This configuration can suppress inconvenience of deformation of first coil 20 or second coil 21 in the XY plane direction or the Z direction and contact and short-circuiting between adjacent turns, in all of the regions between two or more turns.

Furthermore, since second insulating member 60 has the second region, the thickness in the Z direction between first coil 20 and second coil 21 and the permittivity can be controlled as desired in the same manner as in the second embodiment. Thus, the stray capacitance including first coil 20, second coil 21, and the insulating member therebetween can be changed to a desired magnitude. The waveforms of current and voltage output by coil device 101 thus can be controlled to achieve a desired waveform.

Seventh Embodiment

Figure 18:
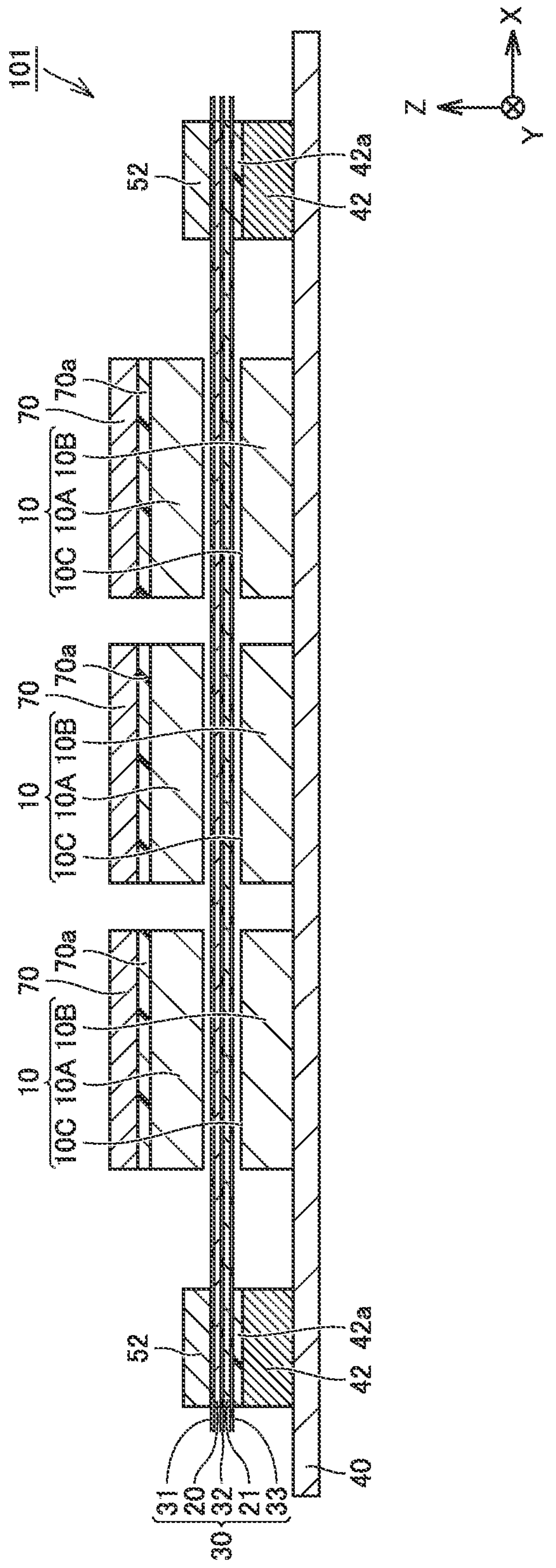
FIG. 18 is a schematic cross-sectional view of the coil device in FIG. 3 in a portion along line XVIII-XVIII in FIG. 3 in a seventh embodiment.

FIG. 18 is a schematic cross-sectional view of the coil device in FIG. 3 in a portion along line XVIII-XVIII in FIG. 3 in a seventh embodiment. Referring to FIG. 18, coil device 101 in the present embodiment differs from coil device 101 in the first embodiment in that it further include a core fixing member 70 arranged immediately above core 10.

Core fixing member 70 in coil device 101 in FIG. 18 is in contact with core 10, specifically, the uppermost surface of upper core 10A with a core heat transfer member 70*a* interposed. In coil device 101, core heat transfer member 70*a* is arranged in contact with the entire uppermost surface of upper core 10A. Furthermore, core fixing member 70 is arranged in contact with the entire surface of heat transfer member 70*a*, that is, so as to overlap with the entire upper core 10A in a two-dimensional view.

Although not illustrated in the drawing, in actuality, core fixing member 70 is fixed to support 40, for example, by screws. Core fixing member 70 thus presses upper core 10A and lower core 10B downward.

It is preferable that core fixing member 70 is formed of the same material and in the same process as support 40 and fixing members 52. However, core fixing member 70 may be formed of a different material and/or in a different process from support 40 and fixing members 52. Core heat transfer member 70*a* is preferably formed of the same material as heat transfer member 42*a* but may be formed of a different material.

<Operation Effect>

The operation effect unique to coil device 101 in FIG. 18 is as follows. In the present embodiment, coil device 101 further includes core fixing member 70 arranged immediately above core 10. Core fixing member 70 presses upper core 10A and lower core 10B downward. Core fixing member 70 therefore enables upper core 10A and lower core 10B of core 10 to be placed so as to be reliably fixed on a surface of support 40.

Upper core 10A is pushed from above with core fixing member 70 interposed, rather than being directly pushed downward from above. Therefore, the force received by upper core 10A from above is applied by core fixing member 70 over the entire surface of upper core 10A. Thus, the load exerted on upper core 10A from above can be distributed such that it is received, for example, from the entire upper surface of upper core 10A, which is a region of upper core 10A overlapping with core fixing member 70. That is, breakage of upper core 10A due to the downward load concentrated on only a partial region of the surface of upper core 10A can be prevented.

Core fixing member 70 is in contact with core 10 with core heat transfer member 70*a* interposed. In this configuration, heat generated from core 10 is mainly transferred to core fixing member 70, thereby suppressing temperature increase of core 10. Although not illustrated in the drawing, core fixing member 70 is fixed to support 40 as described above. Heat transferred from upper core 10A to core fixing member 70 therefore can be not only dissipated upward therefrom and but also dissipated from support 40 to the lower side of coil device 101. In this way, since heat can be dissipated from both above and below, heat dissipation characteristics of coil device 101 are further enhanced. In other words, temperature increase of upper core 10A can be reduced.

Eighth Embodiment

<Configuration of Laminated Coil 30>

Figure 19:
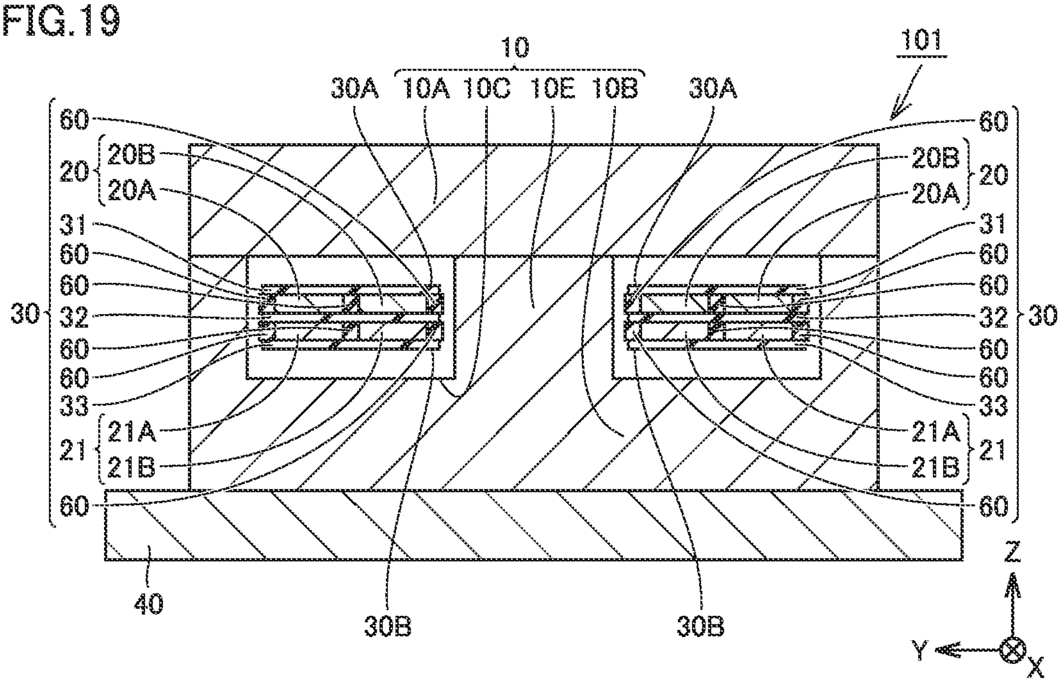
FIG. 19 is a schematic cross-sectional view of the coil device in FIG. 3 in a portion along line A-A in FIG. 3 in an eighth embodiment.
Figure 20:
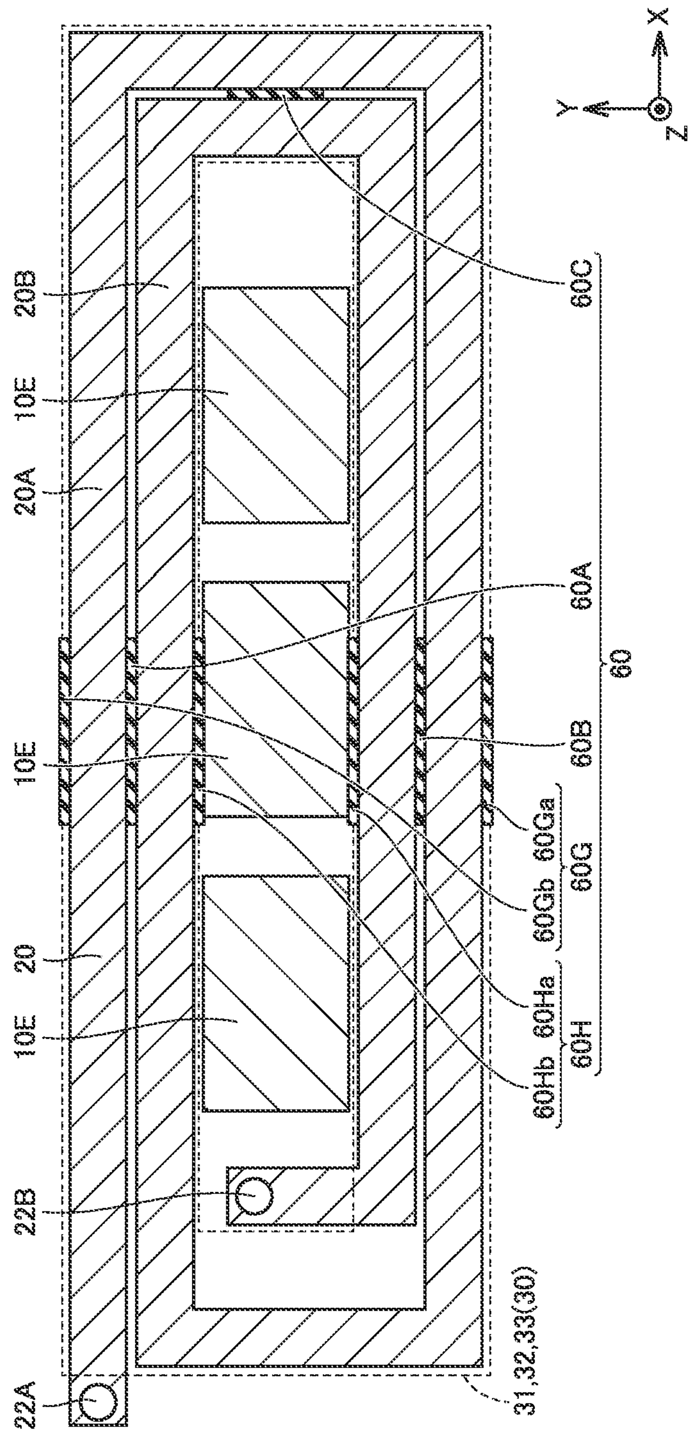
FIG. 20 is a schematic plan view of a portion of the first coil extracted from the coil device in FIG. 19.

FIG. 19 is a schematic cross-sectional view of the coil device in FIG. 3 in a portion along line A-A in FIG. 3 in an eighth embodiment. FIG. 20 is a schematic plan view of a portion of the first coil extracted from the coil device in FIG. 19. Referring to FIG. 19 and FIG. 20, in coil device 101 in the present embodiment, second insulating member 60 of laminated coil 30 is arranged in a region other than between a plurality of turns, in addition to between a plurality of turns of first coil 20 and second coil 21. In this respect, the present embodiment differs from coil device 101 in the first embodiment.

Specifically, as shown in FIG. 19, second insulating member 60 is arranged on the outer side surface that is a side surface facing the outside of first turn 20A that is the outermost turn among a plurality of turns of each of first coil 20 and second coil 21. This second insulating member 60 on the outer side surface is denoted as second insulating member 60G in FIG. 20. In FIG. 20, second insulating member 60Ga and second insulating member 60Gb are arranged on the outer side surfaces of first turn 20A at the positions opposed to wound portion 10E at the center of a region extending in the X direction of first coil 20 wound around wound portion 10E. That is, second insulating members 60Ga and 60Gb are arranged at the same position as wound portion 10E in the X direction. Therefore, second insulating member 60 may be arranged but need not be arranged at a position in the X direction that is not the same as the position of wound portion 10E. Here, second insulating member 60Ga and second insulating member 60Gb are collectively denoted as second insulating member 60G. In FIG. 20, only first coil 20 is illustrated, but second coil 21 is similar.

As shown in FIG. 19, second insulating member 60 is arranged on the inner side surface that is a side surface facing the inside of second turn 20B that is the innermost turn among a plurality of turns of each of first coil 20 and second coil 21. This second insulating member 60 on the inner side surface is denoted as second insulating member 60H in FIG. 20. In FIG. 20, second insulating member 60Ha and second insulating member 60Hb are arranged on the inner side surfaces of second turn 20B at the positions opposed to wound portion 10E, at the center of a region extending in the X direction of first coil 20 wound around wound portion 10E. That is, second insulating members 60Ha and 60Hb are arranged at least at a part of the same position in the X direction as wound portion 10E. Therefore, second insulating member 60 may be arranged but need not be arranged at a position in the X direction that is not the same as the position of wound portion 10E. Here, second insulating member 60Ha and second insulating member 60Hb are collectively denoted as second insulating member 60H. In FIG. 20, only first coil 20 is illustrated, but second coil 21 is similar. In FIG. 20, second insulating members 60A, 60B, and 60C are arranged at positions similar to those in FIG. 6.

Second insulating members 60G and 60H are arranged so as to be sandwiched between a pair of third insulating member 31 and third insulating member 33 in the same manner as in the first embodiment and the like. Second insulating members 60G and 60H are sandwiched between first insulating member 32 and third insulating member 31 and sandwiched between first insulating member 32 and third insulating member 33. Second insulating members 60G and 60H are arranged in cavities 10C of lower core 10B.

<Operation Effect>

In laminated coil 30 in the present embodiment, second insulating members 60G and 60H are arranged on the outer side surfaces of first turns 20A and 21A that are the outermost turns among a plurality of turns of first coil 20 and second coil 21 as a plurality of planar coils and on the inner side surfaces of second turns 20B and 21B (FIG. 19, FIG. 20) that are the innermost turns among a plurality of turns of first coil 20 and second coil 21.

When first coil 20 and second coil 21 are deformed in the Y direction due to vibration during operation of coil device 101, first coil 20 and second coil 21 may come into contact with lower core 10B and be short-circuited. However, according to the present embodiment, second insulating members 60G and 60H are in contact with lower core 10B to provide insulation. This configuration can prevent first coil 20 and second coil 21 from coming into contact with lower core 10B and being short-circuited.

In this laminated coil 30, first coil 20 and second coil 21 that are a plurality of planar coils are wound around wound portion 10E. Second insulating members 60G and 60H on the outer side surfaces and the inner side surfaces may be arranged at positions opposed to wound portion 10E.

When first coil 20 and second coil 21 are deformed in the Y direction due to vibration during operation of coil device 101, first coil 20 and second coil 21 may come into contact with wound portion 10E of lower core 10B and be short-circuited. However, according to the present embodiment, second insulating members 60G and 60H are in contact with wound portion 10E and provide insulation. This configuration can prevent first coil 20 and second coil 21 from coming into contact with wound portion 10E and being short-circuited.

Ninth Embodiment

Figure 21:
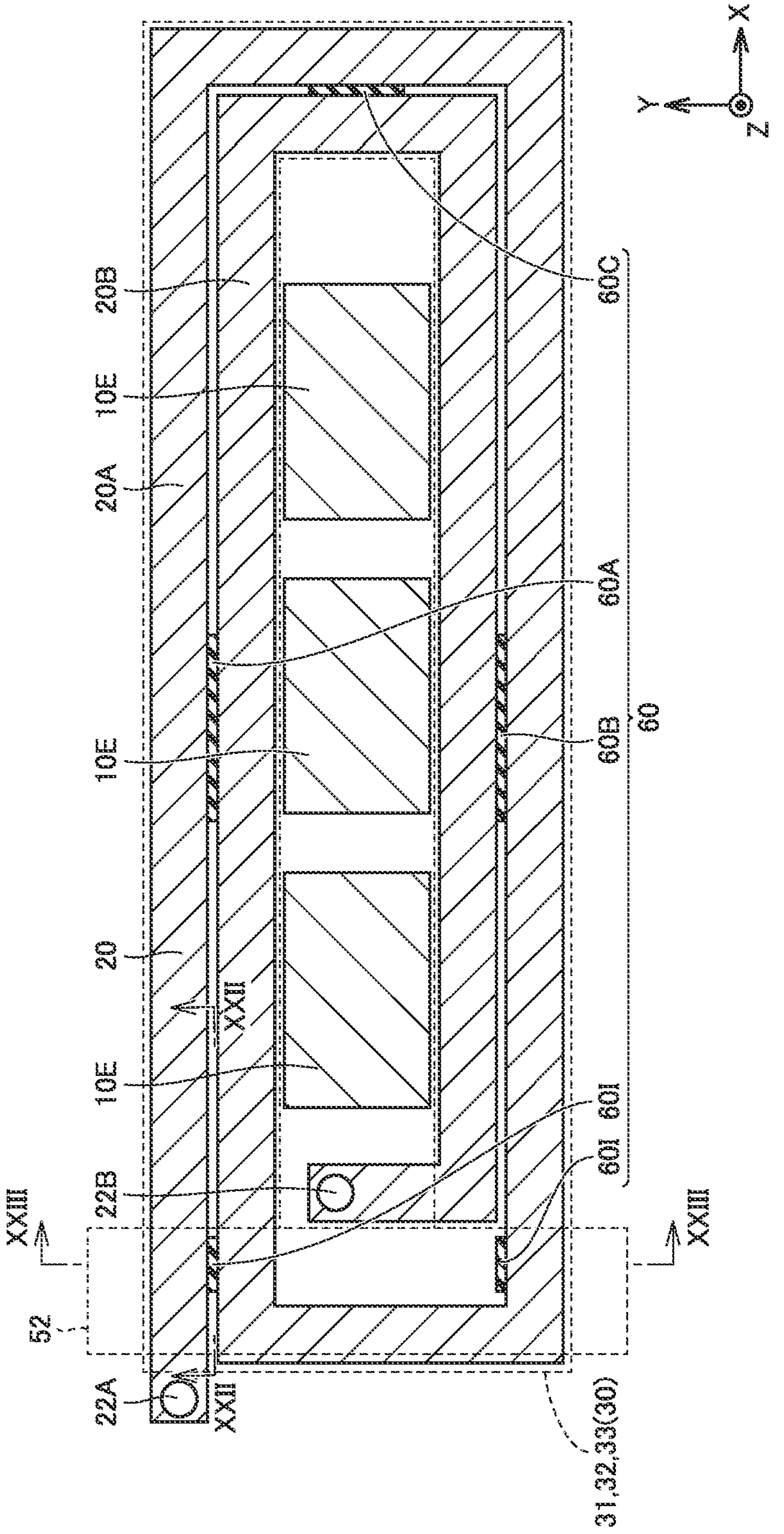
FIG. 21 is a schematic plan view of a portion of the first coil extracted from the coil device in a ninth embodiment.
Figure 22:
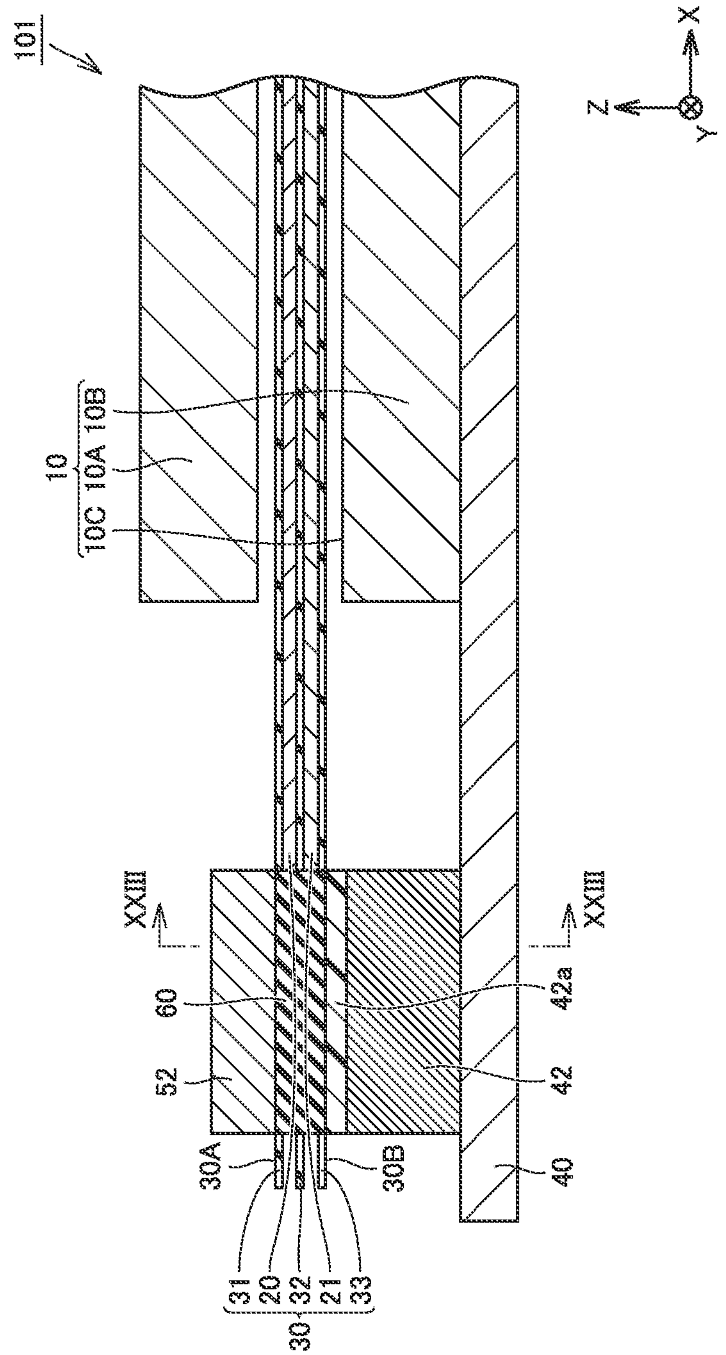
FIG. 22 is a schematic cross-sectional view of the entire coil device in the Z direction in a portion along line XXII-XXII in FIG. 21 in the ninth embodiment.
Figure 23:
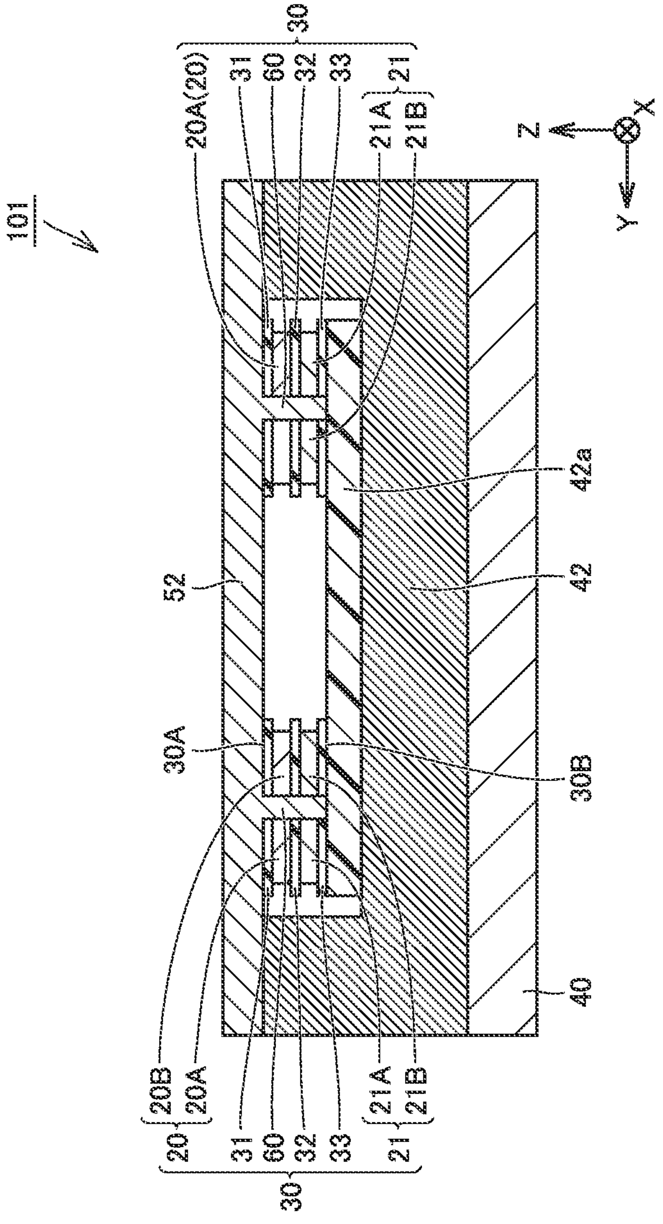
FIG. 23 is a schematic cross-sectional view of the entire coil device in the Z direction in a portion along line XXIII-XXIII in FIG. 21 and FIG. 22 in the ninth embodiment.

FIG. 21 is a schematic plan view of a portion of the first coil extracted from the coil device in a ninth embodiment. FIG. 22 is a schematic cross-sectional view of the entire coil device in the Z direction in a portion along line XXII-XXII in FIG. 21 in the ninth embodiment. FIG. 23 is a schematic cross-sectional view of the entire coil device in the Z direction in a portion along line XXIII-XXIII in FIG. 21 and FIG. 22 in the ninth embodiment. Referring to FIG. 21 to FIG. 23, in coil device 101 in the present embodiment, fixing member 52 is connected to second insulating member 60I that is a portion of second insulating member 60 between first turn 20A and second turn 20B in first coil 20 and between first turn 21A and second turn 21B in second coil 21. In this respect, the present embodiment differs from coil device 101 in the foregoing embodiments in which there is no such connection.

In FIG. 21 to FIG. 23, second insulating member 601 penetrates the entire laminated coil 30 in the Z direction, from one surface 30A that is the uppermost surface of laminated coil 30 to the other surface 30B that is the lowermost surface, for example, in the same manner as second insulating member 60 in cavity 10C in FIG. 15, immediately below fixing member 52. In other words, second insulating member 60I penetrates third insulating members 31 and 33 and the entire laminated coil 30 including them in the Z direction.

For example, when fixing member 52 is formed of a non-conductive material such as resin material, fixing member 52 may be integrated with second insulating member 60I. However, fixing member 52 is not necessarily integrated with second insulating member 60I.

Coil device 101 in FIG. 21 to FIG. 23 is formed as follows. First, laminated coil 30 is arranged on support 40 without second insulating member 60I. Laminated coil 30 is arranged on protruding member 42 and heat transfer member 42*a* in a region overlapping with fixing member 52 in a two-dimensional view. Fixing member 52 is arranged to fix laminated coil 30 to the lower side, that is, toward protruding member 42. When fixing member 52 is arranged, second insulating member 60I integrated therewith is arranged between a plurality of turns of first coil 20 and second coil 21. When fixing member 52 and second insulating member 60I are separate, second insulating member 60I is arranged between a plurality of turns of first coil 20 and second coil 21 immediately before fixing member 52 is arranged. When there are a plurality of regions between turns, second insulating member 60I is arranged between each of the regions between turns.

For example, it is preferable that an end portion in the Z direction of second insulating member 60I has a strength higher than that of first insulating member 32 and third insulating members 31 and 33. The end portion in the Z direction of second insulating member 60I may be sharp rather than being flat. The distal end in the Z direction of second insulating member 60I may have any strength and shape as long as second insulating member 60I penetrates first insulating member 32 and third insulating members 31 and 33.

As a modification to the embodiment above, the end portion in the Z direction of second insulating member 60I may penetrate only some of first insulating member 32, third insulating member 31, and third insulating member 33 rather than penetrating all of them. For example, the end portion in the Z direction of second insulating member 60I may penetrate only first insulating member 32 and third insulating member 31. Second insulating member 60I is arranged so that insulation is provided at least between first turn 20A and second turn 20B in first coil 20 and between first turn 21A and second turn 21B in second coil 21.

<Operation Effect>

In coil device 101 included in power conversion device 1 in the present embodiment, fixing member 52 may be connected to second insulating member 60I between a plurality of turns, that is, between first turn 20A and second turn 20B and between first turn 21A and second turn 21B. Fixing member 52 and second insulating member 60I may be connected (arranged) so as to be continuous to each other.

Second insulating member 60I is arranged to prevent short-circuiting between a plurality of turns when first coil 20 and second coil 21 are deformed. Fixing member 52 is connected to second insulating member 60I so that laminated coil 30 can be fixed more reliably inside coil device 101. This can prevent laminated coil 30 from moving along the XY plane on support 40. Therefore, laminated coil 30 can be positioned precisely, and resistance against vibration in the X direction and the Y direction of laminated coil 30 can be improved.

The features described in the foregoing embodiments (and the examples included therein) may be combined and applied as appropriate in a technically consistent manner. For example, the fourth embodiment and the sixth embodiment may be combined, laminated coil 30 may include three or more coils, and each of the three or more coils may have three or more turns.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST

1 power conversion device, 2 inverter circuit, 3 transformer circuit, 4 rectifying circuit, 5 smoothing circuit, 6 control circuit, 7*a*, 7*b*, 7*c*, 7*d* switching element, 8*a*, 8*b*, 8*c*, 8*d* diode, 9*a*, 9*b* capacitor, 10 core, 10A upper core, 10B lower core, 10C, 42C cavity, 10E wound portion, 20 first coil, 20A, 21A first turn, 20B, 21B second turn, 20C, 21C third turn, 21, 25 second coil, 22A, 22B, 23A, 23B connection member, 30 laminated coil, 30A one surface, 30B the other surface, 31, 33 third insulating member, 32 first insulating member, 34 fourth insulating member, 40 support, 42 protruding member, 42*a* heat transfer member, 52 fixing member, 60, 60A, 60B, 60C, 60D, 60E, 60F, 60G, 60H, 60I second insulating member, 70*a* core heat transfer member, 80 screw, 101, 102, 103, 104 coil device, 110 input terminal, 111 output terminal.

The invention claimed is:

1. A power conversion device comprising:
- a laminated coil comprising:
  - a plurality of planar coils arranged in a first direction along an XY plane; and
  - a first insulating member in a film form arranged between a pair of planar coils adjacent to each other in the first direction among the planar coils, wherein
  - at least one of the planar coils is wound to have a plurality of turns spaced apart from each other in a second direction along the XY plane, and
  - a plurality of second insulating members arranged between the turns adjacent to each other in the second direction of the at least one of the planar coils, wherein
  - the plurality of the second insulating members is arranged between the turns so as to be spaced apart from each other in a circumferential direction in which the laminated coil is wound,
- a support:
- a protruding member fixed to the support; and
- a fixing member arranged at a position overlapping with the protruding member in a two- dimensional view,
- wherein the laminated coil is sandwiched and fixed between the fixing member and the protruding member so as to be in contact with the fixing member and the protruding member.

2. The power conversion device according to claim 1, wherein at least one of the planar coils has a linear portion in a two-dimensional view.

3. The power conversion device according to claim 1, wherein a pair of third insulating members between which the planar coils and the plurality of second insulating members are sandwiched are arranged at one end and the other end in the first direction.

4. The power conversion device according to claim 3, wherein the plurality of second insulating members between the turns extend from an upper surface of one of the pair of third insulating members to a lower surface of an other of the pair of third insulating members.

5. The power conversion device according to claim 3, wherein
- the planar coils include a first coil and a second coil, and
- the plurality of second insulating members includes a first region and a second region, the first region extends between a first turn and a second turn of the first coil with respect to the first direction, the second region extends between the first coil and the third insulating member with respect to the second direction, and the second insulating member is arranged from the first region to the second region to be integrated.

6. The power conversion device according to claim 1, wherein the plurality of second insulating members is arranged on an outer side surface of an outermost turn of the turns of the planar coils and an inner side surface of an innermost turn of the turns.

7. The power conversion device according to claim 6, wherein
- the planar coils are wound around a wound portion, and
- the plurality of second insulating members on the outer side surface and the inner side surface is arranged at a position opposed to the wound portion.

8. The power conversion device according to claim 1, further comprising in total three or more planar coils.

9. The power conversion device according to claim 1, further comprising:
- a plurality of cores spaced apart from each other in a longitudinal direction of the laminated coil,
- wherein the laminated coil is arranged to be wound around the cores.

10. The power conversion device according to claim 1, wherein the fixing member is connected to the plurality of second insulating members between the turns.

11. The power conversion device according to claim 1, wherein at least one of the protruding member and the fixing member has a heat transfer member arranged adjacent to and in contact with the laminated coil.

12. The power conversion device according to claim 1, further comprising a core fixing member arranged immediately above the core.

13. The power conversion device according to claim 3, wherein
- the planar coils include a first coil and a second coil, and
- the plurality of second insulating members includes a third region and a fourth region, the third region extends between a first turn and a second turn of the second coil with respect to the first direction, the fourth region extends between the second coil and the first insulating member with respect to the second direction, and the second insulating member is arranged from the third region to the fourth region to be integrated.

14. The power conversion device according to claim 1, wherein the first insulating member and the third insulating member are different from the plurality of second insulating members as to their materials.

15. The power conversion device according to claim 1, wherein the first insulating member and the third insulating member are formed of polyethylene terephthalate or polyimide or aramid fibers, and the plurality of second insulating members is formed of one selected from the group consisting of glass fiber reinforced epoxy resin, phenolic resin, polyphenylene sulfide, and polyether ether ketone.

* * * * *